(12) United States Patent
Imoto et al.

(10) Patent No.: US 10,862,935 B2
(45) Date of Patent: Dec. 8, 2020

(54) DISTRIBUTION DEVICE AND INFORMATION DEVICE

(71) Applicant: FUNAI ELECTRIC CO., LTD., Osaka (JP)

(72) Inventors: Yoshinobu Imoto, Daito (JP); Yoshikazu Fujita, Osaka (JP); Eiji Nakata, Osaka (JP); Ryuji Ikeda, Higashi Osaka (JP); Masahito Teraoka, Takatsuki (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 149 days.

(21) Appl. No.: 15/404,197

(22) Filed: Jan. 12, 2017

(65) Prior Publication Data

US 2017/0201560 A1 Jul. 13, 2017

(30) Foreign Application Priority Data

Jan. 12, 2016 (JP) .................................. 2016-003919

(51) Int. Cl.
*H04L 29/06* (2006.01)
*H04N 21/41* (2011.01)
(Continued)

(52) U.S. Cl.
CPC ........ *H04L 65/4092* (2013.01); *H04L 65/602* (2013.01); *H04N 21/4126* (2013.01);
(Continued)

(58) Field of Classification Search
CPC ............. H04L 65/4092; H04L 2209/20; H04L 1/0008; H04N 21/23611; H04N 21/236;
(Continued)

(56) References Cited

U.S. PATENT DOCUMENTS 5,822,541 A * 10/1998 Nonomura ............... H04N 7/52
709/247
6,058,109 A * 5/2000 Lechleider ............ H04J 3/1682
370/352

(Continued)

FOREIGN PATENT DOCUMENTS

| CN | 1708159 | 12/2005 |
| JP | 2003-288290 | 10/2003 |
| JP | 2007043281 A * | 2/2007 |

OTHER PUBLICATIONS

ISO 80000-2:2019 second edition Aug. 2019 https://www.sis.se/api/document/preview/80015337/ (Year: 2019).*
ISO 80000-2:2009 first edition Dec. 1, 2009 (Year: 2009).*

*Primary Examiner* — Hitesh Patel
*Assistant Examiner* — Alex H. Tran
(74) *Attorney, Agent, or Firm* — JCIPRNET

(57) ABSTRACT

The disclosure relates to a distribution device and an information device. The distribution device comprises a communication part, a memory part and a controller. The communication part communicates with an external device. The memory part stores a video data. The controller transmits the video data to the external device through the communication part. The controller transmits the video data to the external device based on a request signal from the external device, and the video data includes a predetermined data that is different from the video data.

11 Claims, 17 Drawing Sheets

(51) Int. Cl.
*H04N 21/845* (2011.01)
*H04N 21/442* (2011.01)
*H04N 21/443* (2011.01)
*H04N 21/4147* (2011.01)
*H04N 21/4363* (2011.01)
*H04N 21/4402* (2011.01)
*H04N 21/434* (2011.01)
*H04N 21/6373* (2011.01)
*H04L 1/00* (2006.01)
*H04N 21/236* (2011.01)
*H04J 3/07* (2006.01)

(52) U.S. Cl.
CPC ... *H04N 21/4147* (2013.01); *H04N 21/43637* (2013.01); *H04N 21/443* (2013.01); *H04N 21/4424* (2013.01); *H04N 21/440218* (2013.01); *H04N 21/44227* (2013.01); *H04N 21/8451* (2013.01); *H04N 21/8456* (2013.01); *H04J 3/07* (2013.01); *H04L 1/0008* (2013.01); *H04N 21/23611* (2013.01); *H04N 21/4346* (2013.01); *H04N 21/6373* (2013.01)

(58) Field of Classification Search
CPC .. H04N 21/4346; H04N 7/52; H04N 21/6373; H04J 3/073; H04J 3/076; H04J 3/07; H04J 3/062; H04Q 2213/13363; H04Q 2213/363
See application file for complete search history.

(56) References Cited

U.S. PATENT DOCUMENTS

| | | | | |
|---|---|---|---|---|
| 6,169,843 B1* | 1/2001 | Lenihan | | H04N 9/8042 |
| | | | | 348/E5.005 |
| 6,219,381 B1* | 4/2001 | Sawada | | H04N 5/783 |
| | | | | 348/E7.073 |
| 6,307,974 B1* | 10/2001 | Tsujimoto | | H04N 1/00204 |
| | | | | 370/352 |
| 6,542,518 B1* | 4/2003 | Miyazawa | | H04N 21/23655 |
| | | | | 348/423.1 |
| 6,981,048 B1* | 12/2005 | Abdolbaghian | | H04L 67/14 |
| | | | | 709/203 |
| 7,058,721 B1* | 6/2006 | Ellison | | G11B 27/031 |
| | | | | 348/E5.008 |
| 8,990,408 B1* | 3/2015 | Owen | | H04L 67/303 |
| | | | | 709/227 |
| 10,270,832 B1* | 4/2019 | Hundemer | | H04L 61/6068 |
| 2001/0040872 A1* | 11/2001 | Haglund | | H04L 47/10 |
| | | | | 370/235 |
| 2002/0146023 A1* | 10/2002 | Myers | | H04L 47/10 |
| | | | | 370/412 |
| 2005/0271002 A1* | 12/2005 | Abe | | H04W 28/20 |
| | | | | 370/328 |
| 2006/0026294 A1* | 2/2006 | Virdi | | H04N 21/23438 |
| | | | | 709/232 |
| 2007/0065122 A1* | 3/2007 | Chatterton | | H04N 5/765 |
| | | | | 386/334 |
| 2007/0121678 A1* | 5/2007 | Brooks | | H04N 21/235 |
| | | | | 370/505 |
| 2008/0273554 A1* | 11/2008 | Shao | | H04N 21/262 |
| | | | | 370/498 |
| 2009/0052540 A1* | 2/2009 | Gutman | | H04N 21/23439 |
| | | | | 375/240.24 |
| 2009/0169218 A1* | 7/2009 | Nonaka | | H04J 3/07 |
| | | | | 398/154 |
| 2010/0095336 A1* | 4/2010 | Hirano | | H04N 21/23611 |
| | | | | 725/109 |
| 2010/0158101 A1* | 6/2010 | Wu | | H04N 19/115 |
| | | | | 375/240.01 |
| 2012/0047230 A1* | 2/2012 | Begen | | H04L 65/4092 |
| | | | | 709/219 |
| 2014/0112318 A1* | 4/2014 | Zhou | | H04W 72/04 |
| | | | | 370/336 |
| 2014/0250476 A1* | 9/2014 | Drang | | H04N 21/21 |
| | | | | 725/93 |
| 2015/0146101 A1* | 5/2015 | Shiotani | | H04J 3/0697 |
| | | | | 348/515 |
| 2015/0213839 A1* | 7/2015 | Woodman | | G11B 27/105 |
| | | | | 386/248 |
| 2015/0350745 A1* | 12/2015 | Mizuno | | H04H 20/02 |
| | | | | 725/116 |
| 2016/0248474 A1* | 8/2016 | Gilson | | H04B 3/06 |
| 2017/0215022 A1* | 7/2017 | Chang | | H04L 47/803 |

\* cited by examiner request signal

```
GET http:aaa.bbb.c.dd:eeeee/dms/contents/xxxxxxxxxx_yyyyyyyyyy.m2ts
HTTP/1.1
DummyPacket: 1
HOST: aaa.bbb.f.gg:hhhhh
transferMode.dlna.org: Streaming
getcontentFeatures.dlna.org: 1
``` seek reproduction table

| reproduction time (second) | capacity value (byte) |
|---|---|
| 0 | 0 |
| 1 | 288000 |
| 2 | 672000 |
| 3 | 1056000 |
| ... | ... |
| 10 | 3456000 |

1 second interval

|  search data size when the dummy data is included | search data size when the dummy data is not included |
| --- | --- |
| 2.4Mbps : 192 × 896 (byte) | 2.4Mbps : 192 × 500 (byte) |
| 1.5Mbps : 192 × 640 (byte) | 1.5Mbps : 192 × 360 (byte) |
| 1.0Mbps : 192 × 512 (byte) | 1.0Mbps : 192 × 250 (byte) |
| 0.6Mbps : 192 × 256 (byte) | 0.6Mbps : 192 × 130 (byte) |

FIG. 13 local request signal

```
GET http:jjj.k.l.m/ooo/xxxxxxxxxx_yyyyyyyyyy.m2ts
HTTP/1.1
Range: bytes = 3456000-
HOST: aaa.bbb.f.gg:hhhhh
transferMode.dlna.org: Streaming
getcontentFeatures.dlna.org: 1
```

FIG. 14 conversion code

```
#EXTM3U
#EXT-X-VERSION: 3
#EXT-MEDIA-SEQUENCE:0
#EXT-X-ALLOW-CACHE: NO
#EXT-X-TARGETDURATION: 2
#EXTINF: 2,
xxx000.ts
```

FIG. 15 request signal

```
GET http:aaa.bbb.c.dd:eeeee/dms/contents/xxxxxxxxx_0001.m2ts
HTTP/1.1
CombinationStream: /dms/contents/xxxxxxxxx_0002.m2ts
HOST: aaa.bbb.f.gg:hhhhh
transferMode.dlna.org: Streaming
getcontentFeatures.dlna.org: 1
```

FIG. 20

DISTRIBUTION DEVICE AND INFORMATION DEVICE

CROSS-REFERENCE TO RELATED APPLICATION

This application claims the priority benefit of Japan application serial no. 2016-003919 filed on Jan. 12, 2016. The entirety of the above-mentioned patent application is hereby incorporated by reference herein and made a part of this specification.

BACKGROUND OF THE DISCLOSURE

Field of the Disclosure

The disclosure relates to a distribution device and an information machine, and especially relates to a distribution device that transmits video data and an information machine.

Description of Related Art

A distribution device that transmits video data and an information machine have been known (refer to Patent Document 1, for example).

Patent Document 1 discloses a content distribution server that distributes data such as stream contents, etc. and a user terminal. The content distribution server is configured to transmit data such as stream contents, etc. to the user terminal. The user terminal is configured to receive (download) the data transmitted by the content distribution server.

In a conventional user terminal (information machine) such as the user terminal described in Patent Document 1, an OS (Operating System) that serves as a software for managing the entire system and a plurality of application programs (hereinafter simply referred to as "application(s)") are installed.

PRIOR ART LITERATURE

Patent Literature

Patent Document 1: Japanese Patent Laid-Open No. 2003-288290.

A conventional content distribution server (distribution device) such as the one described in Patent Document 1 is configured to transmit video data while converting (re-encoding) the data to a format that the information device can process. In this case, the transfer rate becomes lower when transmitting video data to the information device because a period of time for performing the conversion process for the video data is required. Also, in a conventional information device such as the one described in Patent Document 1, limitations regarding the data (video data) download based on the transfer rate may be set depending on the specification of the OS. For example, the OS may be configured to execute a process to pause a data download by terminating the communication between the distribution device and the information device when the download (receiving video data) is performed under the situation that the application is running in the background and also the transfer rate of the video data from the distribution device to the information device is lower than a predetermined threshold value. Therefore, a conventional distribution device such as the one described in Patent Document 1 may have difficulty completing transmission of the video data due to deterioration of the transfer rate when the download is performed under the situation that the application at the information device side is running in the background.

SUMMARY OF THE DISCLOSURE

The disclosure is to solve the abovementioned problem and provides a distribution device and an information device that suppress the termination of the video data transmission due to the reduction of the transfer rate.

According to one embodiment, a distribution device is provided, which comprises a communication part, a memory part and a controller. The communication part communicates with an external device. The memory part stores a video data. The controller transmits the video data to the external device through the communication part. The controller transmits the video data to the external device based on a request signal from the external device, and the video data includes a predetermined data that is different from the video data.

In one embodiment, in the above distribution device, the request signal comprises a data size information of the predetermined data, and the controller transmits the video data including the predetermined data having a data size based on the data size information to the external device.

In one embodiment, in the above distribution devices, the controller transmits the video data without including the predetermined data to the external device when a value of the data size information is zero.

In one embodiment, in the above distribution devices, the request signal comprises an information that requests to transmit a plurality of video data, and the controller transmits the plurality of the video data to the external device based on the request signal under a situation that the plurality of the video data is combined. The controller transmits the video data including the predetermined data to the external device on a basis that a transmission of a portion of the plurality of the video data is completed.

In one embodiment, in the above distribution devices, the predetermined data is a packet having a data size that is equal to a natural number multiple of a data size of a packet when the video data is transmitted.

In one embodiment, in the above distribution devices, the controller transmits a packet of the video data and a packet of the predetermined data as separate packets to the external device.

In one embodiment, in the above distribution devices, the controller transmits the video data including the predetermined data to the external device on a basis that a transfer rate of transmitting the video data to the external device becomes less than or equal to a first threshold value.

In one embodiment, in the above distribution devices, the controller transmits the video data without including the predetermined data to the external device on a basis that a transfer rate of transmitting the video data to the external device becomes greater than the first threshold value.

In one embodiment, in the above distribution devices, the request signal includes an information of a requested transfer rate, and the controller transmits the video data including the predetermined data having a large data size to the external device when the request transfer rate is low, and transmits the video data including the predetermined data having a small data size to the external device when the requested transfer rate is high.

In the disclosure, the predetermined data is described as data in general that is added to video data. The predetermined data is not limited to a single value and described as a broad concept including identification information of a device, etc.

In addition, it is possible to suppress the reduction of the transfer rate of the video data transmitted from the distribution device to the external device since the predetermined data is added to the video data. As a result, it is possible to suppress the termination of the video data transmission due to the reduction of the transfer rate even the OS of the external device is configured to terminate the communication between the external device and the distribution system when the download is performed under the situation that the application is running in the background and also the transfer rate is less than a predetermined threshold value.

Besides, in the above configuration, the predetermined data having an appropriate data size according to the request of the external device can be added to the video data. As a result, it is suppressed that the video data to which the predetermined data having an excessively large data size compared to the data size required by the external device is added is transmitted. Thereby, it is possible to suppress the increase in the capacity of the external device required to store the video data and the predetermined data. Also, it is suppressed that the video data to which the predetermined data having an excessively small data size compared to the data size required by the external device is added is transmitted. Thereby, it is possible to suppress the termination of the communication between the external device and the distribution device by the OS due to the reduction of the transfer rate because of an extremely small data size.

In addition, in the case where a plurality of video data is sent to the external device, after the transmission of a portion of the plurality of video data is completed, the transfer rate decreases compared to the transfer rate before the completion. In the disclosure, the controller is configured to add the predetermined data to the video data, the transmission of which is not completed yet, on the basis that the transmission of a portion of the plurality of video data is completed, and to transmit the video data with the predetermined data added thereto to the external device. Thus, in the case where the transmission of a portion of the plurality of video data is completed, the predetermined data is added to the video data, the transmission of which is not completed yet. Thereby, it is possible to suppress the reduction of the transfer rate due to completion of the transmission of a portion of the video data.

Further, in the above configuration, it is possible to transmit a packet of the video data and a packet of the predetermined data as separate packets. As a result, it is possible to easily determine whether the data downloaded by the information device is the video data or the predetermined data at the external device side.

In the above configurations, it is possible to suppress the addition of the predetermined data even when the transfer rate decreases to a level that is still higher than the first threshold value (a predetermined threshold value), which requires to add the predetermined data. Also, because the predetermined data is added on the basis that the transfer rate becomes less than or equal to the first threshold value, it is possible to effectively suppress that the transmission of the video data is terminated due to the reduction of the transfer rate.

According to another embodiment of the disclosure, an information device is further provided, which comprises a communication part and a controller. The communication part communicates with an external device. The controller executes an application that reproduces a video data downloaded from the external device through the communication part. The controller transmits a request signal to the external device through the communication part under a situation that the application is running in a background, and receives the video data including the predetermined data from the external device, in which the request signal is for requesting the video data including a predetermined data that is different from the video data.

In one embodiment, in the above information device, the request signal comprises an information of a requested transfer rate and a data size information of the predetermined data requested, and the controller transmits the request signal to the external device, and the request signal is for requesting the video data including the predetermined data having a data size corresponding to the requested transfer rate.

In one embodiment, in the above information devices, the controller transmits the request signal for requesting the video data including the predetermined data having a large data size to the external device when the requested transfer rate is low, and transmits the request signal for requesting the video data including the predetermined data having a small data size to the external device when the requested transfer rate is high.

In one embodiment, in the above information devices, the controller transmits the request signal in which a value of the data size information is set to zero to the external device when requesting the video data without the predetermined data.

In one embodiment, in the above information devices, the controller transmits the request signal in which a value of the data size information is set to a natural number greater than or equal to one to the external device when requesting the data size including the predetermined data.

In one embodiment, in the above information devices, the controller transmits the request signal for requesting the video data including the predetermined data having a data size with which a transfer rate of the video data becomes greater than or equal to a second threshold value to the external device.

In one embodiment, in the above information devices, the controller determines whether the video data or the predetermined data is downloaded for each predetermined data size in the video data downloaded from the external device.

In one embodiment, in the above information devices, the controller determines whether the video data or the predetermined data is downloaded based on a portion of data of each predetermined data size in the video data downloaded from the external device.

In one embodiment, in the above information devices, the controller converts a format of the video data including the predetermined data downloaded from the external device to a reproducible format, and deletes the predetermined data.

In one embodiment, in the above information devices, the controller transmits the request signal to the external device on a basis that a process to convert the video data to the reproducible format does not complete within a predetermined period of time after a download of the video data including the predetermined data is completed.

In one embodiment, in the above information devices, the information device further comprises a memory part, storing the video data. The controller stores the video data including the predetermined data in the memory part, and creates a reproduction data that correlates a reproduction time of the video data and a capacity value of the video data, and the controller converts the video data to the reproducible format with a specified reproduction position as a starting point based on the reproduction data when specifying a reproduction position in the video data to reproduce the video data.

In the information device, under the situation that the application is running in the background, the controller of the information device transmits a request signal for requesting the video data with the predetermined data added thereto to the external device (such as a distribution device) through the communication part, and receives the video data with the predetermined data added thereto from the external device.

In addition, also with this information device, it is possible to suppress the termination of the transmission (downloading) of the video data due to the reduction of the transfer rate under the situation that the application is running in the background. Also, the controller is configured to transmit the request signal for requesting the video data with the predetermined data added thereto to the external device through the communication part under the situation that the application is running in the background. Thereby, it is possible to easily notify the external device that the application is running in the background and to request the video data with the predetermined data added thereto.

By the above configuration, it is possible to request the external device to add the predetermined data having a large data size to the video data when the transfer rate requested by the information device is relatively low, and to add the predetermined data having a small data size to the video data when the transfer rate requested by the information device is relatively high. Accordingly, it is possible to suppress deterioration of the transfer rate since the video data with the predetermined data having a more appropriate data size added thereto can be downloaded.

In the above configuration, it is possible to download the video data with the predetermined data added thereto under the situation that the transfer rate is greater than or equal to the predetermined threshold value more certainly by setting the second threshold value to be greater than or equal to the predetermined threshold value. As a result, it is possible to suppress the termination of the download of the video data by the operating system.

In the above configuration, the number of times of the process to determine whether the downloaded data is the video data or the predetermined data can be reduced compared to determining by inspecting the entire downloaded data.

In such a configuration, the video data from which the predetermined data is deleted can be played.

In this case, depending on the specification of the OS, the period of time within which the application can process video data after completion of the download of the video data may be limited to a predetermined period of time. The process to convert the video data to a reproducible format may not complete within the predetermined period of time. Taking this to account, the disclosure configures the controller to transmit the request signal to the external device on the basis that the process to convert the video data to a reproducible format does not complete within the predetermined period of time after completion of the download of the video data with the predetermined data added thereto. Thereby, in the case where the process to convert the video data to a reproducible format does not complete within the predetermined period of time, the process to convert the video data to a reproducible format can be performed during the predetermined period of time after completion of the download of the re-transmitted video data. Accordingly, the predetermined period of time can be substantially extended.

Depending on the specification of the OS, the period of time within which the application can process video data after completion of the download of the video data may be limited to a predetermined period of time, and a delay period for delaying the start time of the application process may be configured. In addition, the OS may be increase the delay period as the number of download increases. Thus, when the application increases the number of download to perform the process to convert the video data to a reproducible format, the period of time to complete the process to convert the video to a reproducible format is increased by the OS. Taking this into account, the present disclosure can suppress the increase in the number of download by the abovementioned configuration because the period of time required to create the reproduction data is shorter than the period of time required to covert the video data to a reproducible format. Also, the video data can be reproduced from an arbitrary reproduction position based on the reproduction data.

According to the disclosure, as mentioned above, it is possible to suppress the termination of the video data transmission due to the reduction of the transfer rate.

BRIEF DESCRIPTION OF THE DRAWINGS

FIG. 13 is another diagram for describing the search data size when creating the seek reproduction table of the information device according to the second embodiment.

FIG. 14 is a diagram for describing the local request signal of the information device according to the second embodiment.

FIG. 15 is a diagram for describing the conversion code of the information device according to the second embodiment.

FIG. 20 is a diagram for describing the request signal of the information device according to the fourth embodiment.

DESCRIPTION OF THE EMBODIMENTS

Hereinafter, embodiments of the disclosure are described based on the accompanying drawings.

First Embodiment

Configuration of Distribution System

Figure 1:
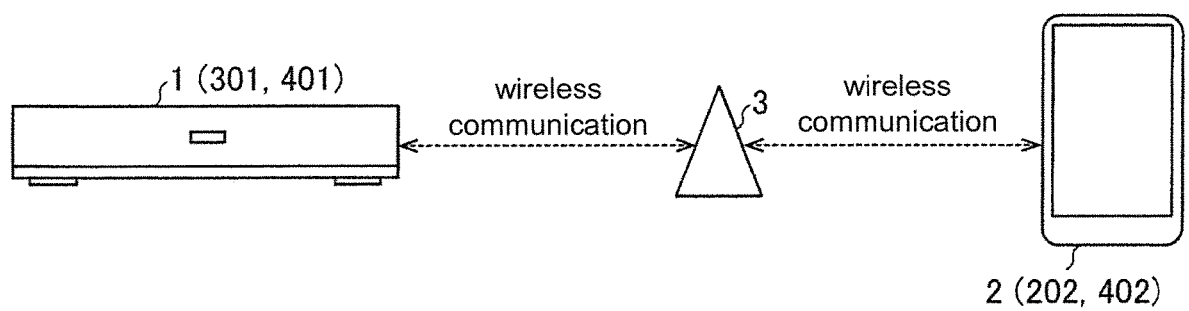
FIG. 1 is a diagram illustrating a distribution system according to the first to fourth embodiments.

Firstly, referring to FIG. 1, the configuration of a distribution system 100 according to the first embodiment of the present invention is described.

The distribution system according to the first embodiment of the present invention includes a distribution device 1 and an information device 2, as shown in FIG. 1. The distribution system 100 further includes an access point 3. In the distribution system 100, the distribution device 1 and the information device 2 are configured to wirelessly communicate with each other via the access point 3. The distribution device 1 is an example of "external distribution device" in the claims. The information device is an example of "external device" in the claims.

The distribution device 1 is a device that distributes video data (refer to FIG. 2) to an external device (the information device 2, for example). Specifically, the distribution device 1 is a recording device (recorder) that is capable of recording digital television broadcast, and configured to distribute a recorded broadcasting program or a broadcasting program currently being watched as video data.

The information device 2 is a device that downloads video data (refer to FIG. 3) from an external device (the distribution device 1, for example). Specifically, the information device 2 is a portable information device (information terminal) such as a smart phone or a tablet PC, etc. and configured to download (receive and store) video data from the distribution device 1. The information device 2 is configured to be able to reproduce downloaded video data.

Also, in the distribution system 100, the distribution device 1 and the information device 2 are capable of communicating with each other based on the technology of DLNA (Digital Living Network Alliance) (Registered trademark).

Here, in the first embodiment, the distribution system 100 is configured such that a dummy data is included (or added in following descriptions) to video data by the distribution device 1 when the video data is downloaded by the information device 2 under the situation that an application program that handles to the video data (video reproduction application 23) in the information device 2 is running in the background. The distribution system 100 is configured such that the video data with the dummy data added by the distribution device 1 is transmitted to the information device 2. The video reproduction application 23 is an example of "application" in the claims. The dummy data is an example of "predetermined data" in the scope of the claims. In the disclosure, the dummy data means data in general to be added to video data. The dummy data is not limited to a single value ("0xFF", for example) and described as a broad concept including identification information (ID) of a device, etc.

Configuration of Distribution Device

Figure 2:
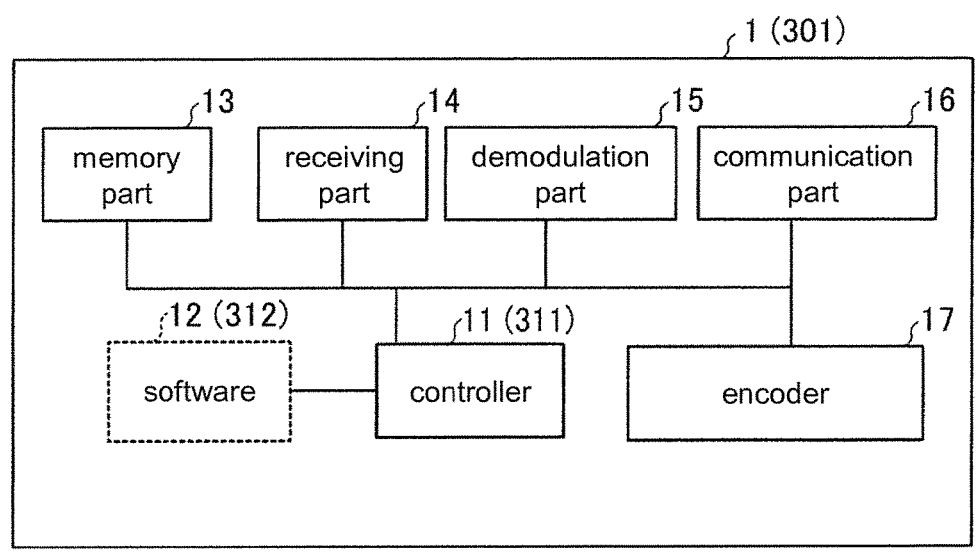
FIG. 2 is a block diagram illustrating the overall configuration of a distribution device according to the first and third embodiments.

Next, referring to FIG. 2, the configuration of the distribution device 1 is described. A controller 11 is disposed in the distribution device 1. The controller 11 includes a CPU (Central Processing Unit), and is configured to control the whole operations of the distribution device 1. The controller 11 is configured to execute a program of software 12.

Also, a memory part 13 is disposed in the distribution device 1. The memory part 13 is configured to store (record) video data. The memory part 13 is configured to store video data that is received by a receiving part 14 and demodulated by a demodulation part 15. The software 12 is pre-stored in the memory part 13.

The receiving part 14 is disposed in the distribution device 1. The receiving part 14 is configured to receive digital television broadcast.

The demodulation part 15 is disposed in the distribution device 1. The demodulation part 15 is configured to demodulate the digital television broadcast received by the receiving part 14 to a format based on a predetermined specification. For example, the demodulation part 15 is configured to encode the digital television broadcast to the DR (Direct Recording) format. The memory part 13 is configured to store video data in the DR format.

Also, a communication part 16 is disposed in the distribution device 1. The communication part 16 is configured to be able to perform wireless communication based on a predetermined specification (IEEE 802.11 standard, for example). The communication part 16 is configured to wirelessly communicate with the information device 2 via the access point 3.

Also, an encoder 17 is disposed in the distribution device 1. The encoder 17 is configured to convert (re-encode) video data in the DR format to the AVC (Advanced Video Coding) format. The information device 2 is configured to be able to process video data in the AVC format. Also, the information device 2 is configured to be able to reproduce video data by processing the HLS (HTTP Live Streaming) conversion for video data in the AVC format.

In the distribution device 1, the controller 11 is configured to transmit video data in the AVC format through the communication part 16 from the distribution device 1 to the information device 2, wherein the video data is converted (while the video data is being converted) from the DR format to the AVC format by the encoder 17. Thus, a transfer rate R may be deteriorated due to performing the process to convert video data from the DR format to the AVC format, compared to transmitting the video data without the conversion process.

Then, an OS 22 of the information device 2 is configured to compare the transfer rate R and an termination threshold value t1 when the video data is downloaded from the distribution device 1 under the situation that the video reproduction application 23 is running in the background and also after a predetermined period of time (30 to 60 minutes, for example) has passed, as described later. The OS 22 is configured to terminate the download of the video data on the basis that (when) the transfer rate R becomes lower than the termination threshold value t1. Therefore, the download of the video data may not complete in the case where the transfer rate R is reduced. The term threshold value t1 is an example of the "second threshold value" in the claims.

Configuration of Controller of Distribution Device

Figures 4, 5:
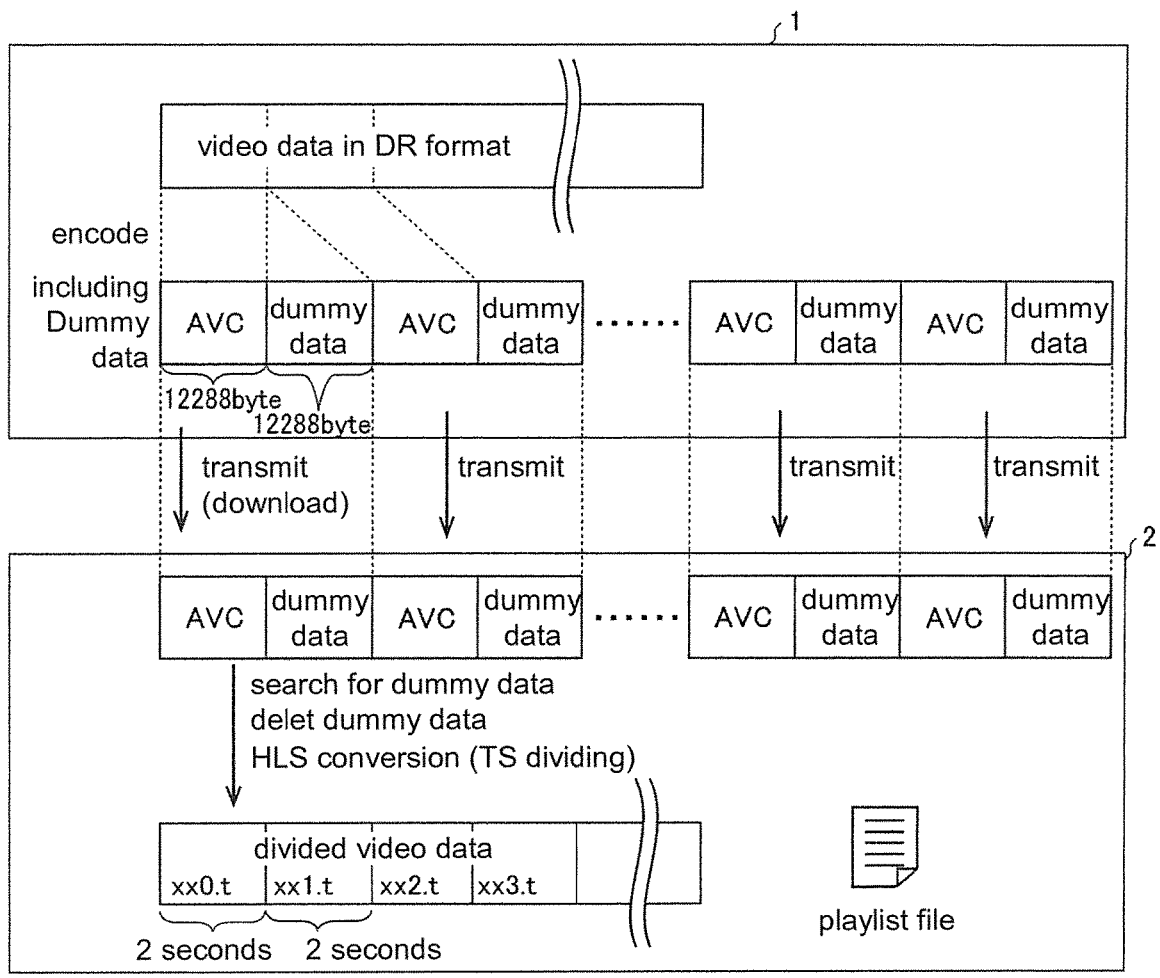
FIG. 4 is a diagram for describing the process of the distribution system according to the first embodiment to add a dummy data (predetermined data) to the video data.
FIG. 5 is a diagram for describing the request signal of the distribution system according to the first embodiment.

Therefore, in the first embodiment, as shown in FIG. 4, the controller 1 of the distribution device 1 is configured to add the dummy data to the video data. In detail, the controller 11 of the distribution device 1 is configured to add the dummy data to the video data and to transmit the video data with the dummy data added thereto to the information device 2 when the video data is downloaded under the situation that the video reproduction application 23 is running in the background in the information device 2. That is, the controller 11 is configured to increase the transfer rate R (suppress the reduction) by adding the dummy data to the video data.

In detail, the encoder 17 is configured to divide the video data encoded to the AVC format into packets having a chunk size (every 12,288 bytes, for example). The video data encoded to the AVC format is hereinafter referred to as "encoded data", and simply depicted as "AVC" in FIG. 4, etc. The chunk size is an example of the "data size of the packet when the video data is transmitted" in the claims.

In addition, as shown in FIG. 4, the controller 11 is configured to generate the dummy data. Here, in the first embodiment, the dummy data is constituted as a packet having a data size that is equal to a natural number multiple of a data size (chunk size) of the packet (encoded data) when the video data is transmitted. The dummy data is set to the value of, for example, "0xFF" including the timestamp field.

The controller 11 is configured to transmit the encoded data with the dummy data added thereto to the information device 2 through the communication part 16. Specifically, as shown in FIG. 4, the controller 11 is configured to transmit the encoded data and the dummy data (dummy packet) per chunk size to the information device 2. FIG. 4 shows an example of the dummy packet which is constituted to have a data size that is one time the chunk size (12,288 bytes). In this case, the controller 11 is configured to alternately transmit the encoded data and the dummy data per chunk size to the information device 2. In the example case of FIG. 4, the distribution device 1 can make the transfer rate R substantially double compared to sending only the encoded data.

Also, in the first embodiment, the controller 11 is configured to add the dummy data to the encoded data according to a request signal which requests the video data with the dummy data added thereto from the information device 2.

FIG. 5 shows an example of the request signal. In the first embodiment, the request signal includes a signal (information) of "DummyPacket". The information of "Dummy-Packet" is the information of the data size of the dummy data, and is indicated as a natural number, for example. The controller 11 is configured to determine the data size of the dummy data based on the value of "DummyPacket". The information of "DummyPacket" is an example of the "information of the data size" the claims.

In detail, the controller 11 is configured to add the dummy data which is constituted to have a data size that is one time the chunk size (12,288 bytes multiplied by 1, for example) to the encoded data when the value of "DummyPacket" is one. The controller 11 is configured to add the dummy data which is constituted to have a data size that is four times the chunk size (12,288 bytes multiplied by 4, for example) to the encoded data when the value of "DummyPacket" is four.

Also, the controller 11 is configured to transmit the encoded data without adding the dummy data to the information device 2 when the value of "DummyPacket" is zero. For example, the information device 2 sets the value of "DummyPacket" to zero when downloading the video data under the situation that the video reproduction application 23 is running in the foreground.

Accordingly, the controller 11 is configured to add the dummy data to the video data (encoded data) when the value of "DummyPacket" is a natural number that is greater than or equal to one if the video data is downloaded by the information device 2 under the situation that the video reproduction application 23 corresponding the video data is running in the background in the information device 2. On the other hand, the controller 11 is configured not to add the dummy data to the video data (encoded data) when the value of "DummyPacket" is zero if the video data is downloaded by the information device 2 under the situation that the video reproduction application 23 corresponding the video data is running in the foreground in the information device 2.

The request signal includes information of "GET" that is a signal requesting the video data (information of the URL of the video data). That is, the controller 11 is configured to add the dummy data having a data size based on the value of "DummyPacket" to the video data (encoded data) based on the information of "GET". The controller 11 is configured to transmit the encoded data with the dummy data added thereto to the information device 2 according to the request signal.

Configuration of Information Device

Figure 3:
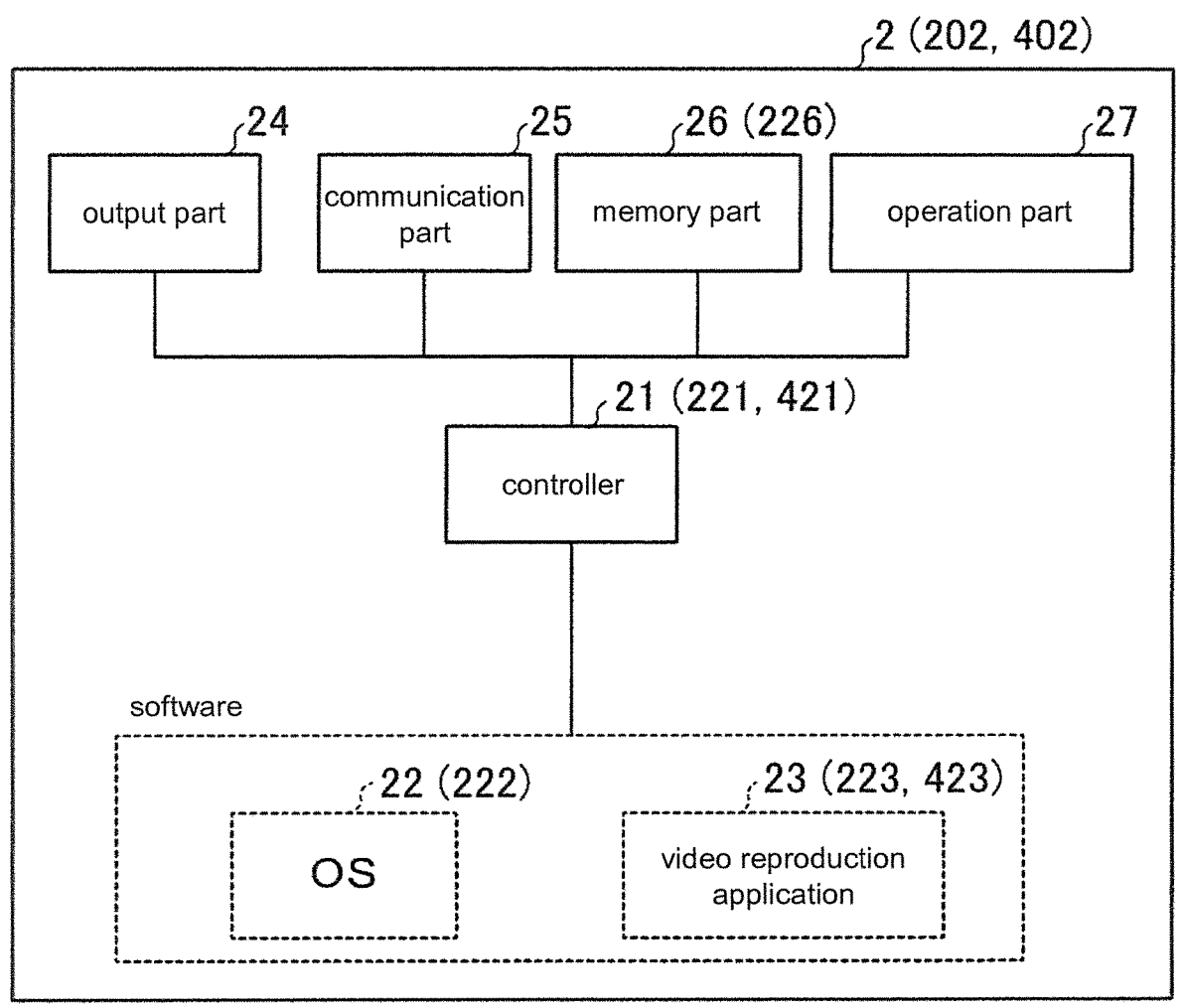
FIG. 3 is a block diagram illustrating the overall configuration of an information device according to the first to fourth embodiments.

Next, referring to FIG. 3, the configuration of the information device 2 is described. As shown in FIG. 3, a controller 21 is disposed in the information device 2. The controller 21 includes a CPU and is configured to control whole operations of the information device 2. Also, the controller 21 is configured to execute an OS (Operating System) 22 and programs such as the video reproduction application 23, etc.

An output part 24 is disposed in the information device 2. The output part 24 includes a display part that outputs image data of the video data and an audio output part that outputs audio data of the video data. The output part 24 is configured to output the image data and the audio data when the video data is reproduced.

A communication part 25 is disposed in the information device 2. The communication part 25 is configured to perform wireless communication based on a predetermined specification (IEEE 802.11 standard, for example). The communication part 25 is configured to wirelessly communicate with the distribution device 1 via the access point 3.

A memory part 26 is disposed in the information device 2. The memory part 26 is configured to store data as a local server. In the memory part 26, for example, downloaded video data, the OS 22 and programs such as the video reproducing application 23, etc. are stored.

An operation part 27 is disposed in the information device 2. The operation part 27 includes operation buttons and a touch panel, etc. and is configured to accept user operations. The information device 2 is configured to function according to the user operation from the operation part 27.

The OS 22 is installed in the information device 2. The OS 22 is a program that manages the entire system within the information device 2. The OS 22 is configured to change the state of applications such as the video reproduction application 23, etc. based on the application lifecycle shown in FIG. 6.

Figure 6:
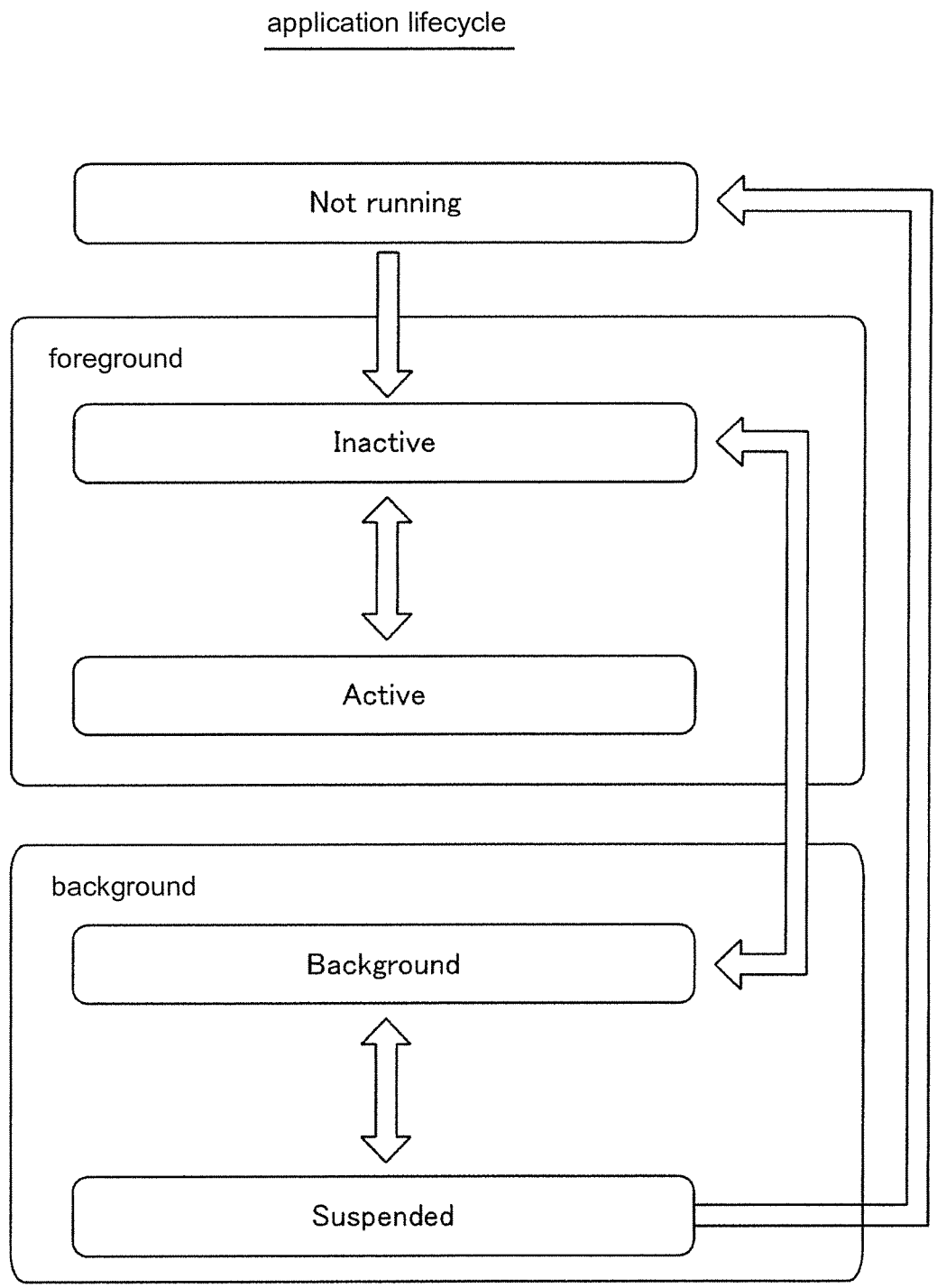
FIG. 6 is a diagram for describing the application lifecycle of the information device according to the first embodiment.

In FIG. 6, "Not running" is a state that the application is not executed or terminated after running.

"Inactive" is a state that the application is running in the foreground but not processing instructions (code). The foreground is a state that an operation screen is displayed on a display part of the output part 24 and application is the target of the operation. The OS 22 changes the state of the application from "Not running" to "Inactive" when the application is executed by, for example, an operation using the operation part 27.

"Active" is a state that the application is running in the foreground and processing instructions (code). The OS 22 switches the state of the application between "Inactive" and "Active".

"Background" is a state that the application is running in the background and processing instructions (code). The background is a state that the operation screen is not displayed on the display part of the output part 24 and the application is not the target of the operation. The OS 22 switches the state of the application between "Inactive" and "Active".

"Suspended" is a state that the application is running in the background but not processing instructions (code). The OS 22 switches the state of the application between "Background" and "Suspended". Also, the OS 22 changes the state of the application from "Suspended" to "Not running".

That is, the foreground includes the state of "Inactive" and the state of "Active".

The background includes the state of "Background" and the state of "Suspended". That is, the disclosure describes the background as a broad concept including not only the state of "Background" but also the state of "Suspended". In the disclosure, the background indicates a state that the video reproduction application 23 is stored in the background memory of the controller 21 or the memory part 26 regardless of whether the code (instructions) is processed or not. Also, the disclosure describes that a state that the video reproduction application 23 is stored in the background memory of the controller 21 or the memory part 26 means a state that the video reproduction application 23 is running in the background.

The OS 22 is configured to obtain the transfer rate R of the video data being downloaded from the distribution device 1. The OS 22 is configured to compare the transfer rate R and the termination threshold value t1 when the video data is downloaded from the distribution device 1 while the application is running in the background and also a predetermined period of time (30 to 60 minutes, for example) has passed. For example, the OS 22 is configured to compare the transfer rate R of 15 seconds immediately preceding the current time with the termination threshold value t1, or to compare the transfer rate R of the 10 immediately preceding the current time with the termination threshold value t1.

The OS 22 is configured to terminate (halt) the download of the video data (terminate the communication between the distribution device 1 and the information device 2) on the basis that the transfer rate R becomes lower than the termination threshold value t1. In addition, the OS 22 is configured not to terminate the download regardless of the transfer rate R when the video data is downloaded from the distribution device 1 under the situation that the video reproduction application 23 is running in the foreground.

The OS 22 is configured to change the state from "Suspended" to "Background" after the download of data such as the video data is completed without termination under the situation that the video reproduction application 23 is running in the background ("Suspended"). Thereby, the video reproduction application can perform post-download process to the downloaded video data.

The OS 22 is configured to forcibly change the state from "Background" to "Suspended" when the processes under "Background" do not complete within a predetermined period of time (predetermined time limit) (30 seconds, for example) after the download of data such as the video data is completed.

Configuration of Controller of Information Device Related to Video Data Download The video reproduction application 23 is an application for reproducing the video data. Specifically, the video reproduction application 23 is configured to be able to download the video data from the distribution devices 1 through the communication part 25, and reproduce the downloaded video data.

Figure 7:
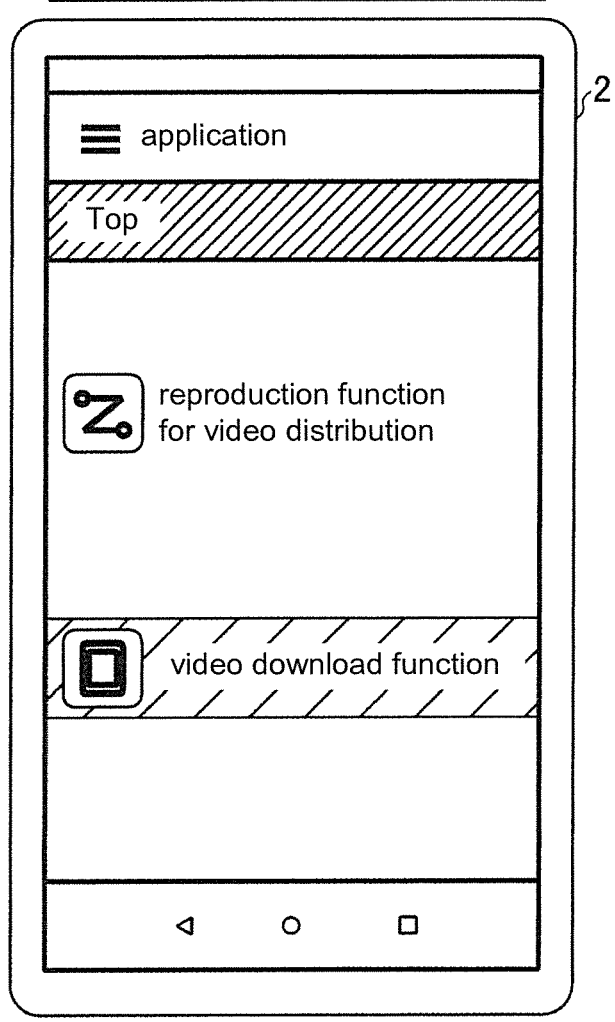
FIG. 7 is a diagram for describing the selection menu for the functions of the application of the information device according to the first embodiment.

Also, as shown in FIG. 7, the video reproduction application 23 is an application having a reproducing function for distributed video and a video download function.

The reproducing function for distributed video of the video reproduction application 23 is a function to sequentially reproduce the video data while downloading the video data from the distribution device 1. In this case, the download of the video data from the distribution device 1 is performed under the situation that the video reproduction application 23 is running in the foreground.

The video download function of the video reproduction application 23 is a function to download the video data from the distribution device 1 without sequentially reproducing the video data, unlike the reproducing function for distributed video. In this case, the download of the video data from the distribution device 1 is performed under the situation that the video reproduction application 23 is running in the background (the "Suspended" state).

The user can watch the video data by selecting either the reproducing function for distributed video or the video download function as needed.

Figure 8:
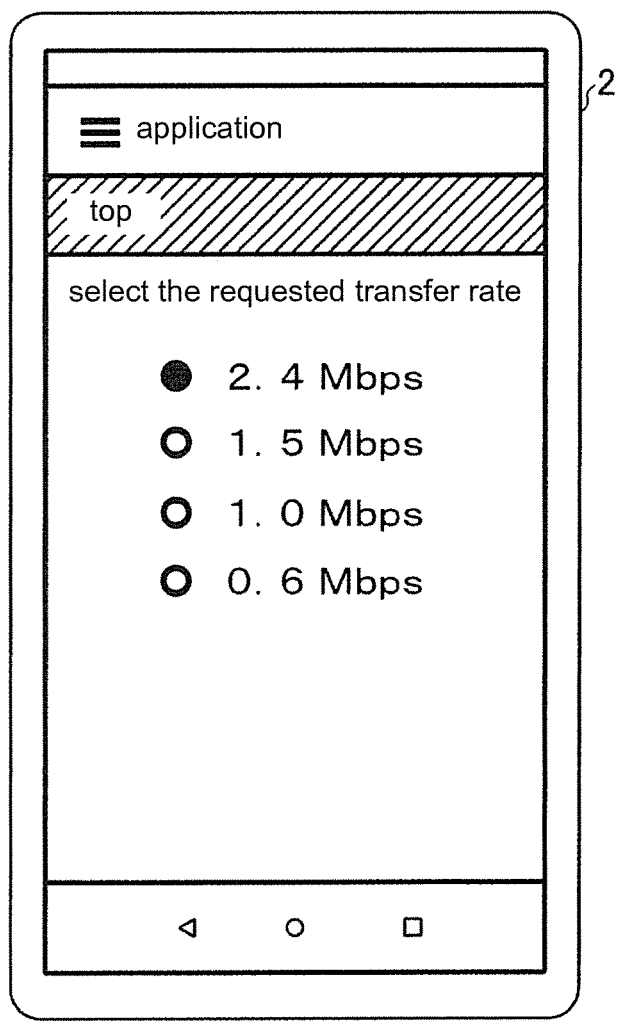
FIG. 8 is a diagram for describing the selection menu for the requested transfer rate of the information device according to the first embodiment.

Also, as shown in FIG. 8, the video reproduction application 23 is configured to determine the requested transfer rate based on a selecting operation by the user. For example, the user can select the requested transfer rate from 2.4 Mbps, 1.5 Mbps, 1.0 Mbps or 0.6 Mbps as needed. FIG. 8 shows an example that 2.4 Mbps is selected.

Here, in the first embodiment, as shown in FIG. 5, the controller 21 is configured to transmit the request signal for requesting the video data with the dummy data added thereto to the distribution device 1 through the communication part 25 under the situation that the video reproduction application 23 is running in the background (and also when downloading the video data).

Specifically, as mentioned above, the controller 21 is configured to transmit the request signal shown in FIG. 5 to the distribution device 1. Here, the controller 21 (video reproduction application 23) is configured to set the value of "DummyPacket" of the request signal to zero when (on the basis that) the "reproducing function for distributed video" is selected by the user. That is, the controller 21 is configured not to request the dummy data when the video data is to be downloaded under the situation that the video reproduction application 23 is running in the foreground.

Also, the controller 21 (video reproduction application 23) is configured to set the value of "DummyPacket" of the request signal to greater than or equal to one when (on the basis that) the "video download function" is selected by the user. The controller 21 is configured to set the value of "DunmmyPacket" based on the requested transfer rate selected by the user.

In addition, in the first embodiment, the controller 21 (video reproduction application 23) is configured to transmit the request signal (including the value of "DummyPacket") for requesting the video data with the dummy data having a data size with which the transfer rate R becomes greater than or equal to the termination threshold value t1 to the distribution device 1.

Specifically, in the first embodiment, the controller 21 (video reproduction application 23) is configured to transmit the request signal to the distribution device 1, where the request signal is for requesting the video data with the dummy data having a data size corresponding to the requested transfer rate. For example, as shown in FIGS. 5 and 8, the controller 21 (video reproduction application 23) is configured to set (determine) the value of "DummyPacket" to: 1 when "2.4 Mbps" is selected; 2 when "1.5 Mbps" is selected; 3 when "1.0 Mbps" is selected; and 4 when "0.6 Mbps" is selected. That is, each of the abovementioned value of "DummyPacket" indicates the data size with which the transfer rate R becomes greater than or equal to the termination threshold value t1.

As shown in FIG. 4, the controller 21 is configured to download the video data (encoded data) which is converted to the AVC format and the dummy data is added by the distribution device 1 based on the request signal.

On the basis that (When) the transmission of the video data is completed, a transmission completion signal to notify the completion of the data transmission is transmitted to the information device 2. Then, the OS 22 of the information device 2 changes the state of the video reproduction application 23 from "Suspended" to "Background" on the basis that (when) the download of the video data completes under the situation that the state of the video reproduction application 23 is "Suspended" (on the basis that the transmission completion signal notifying the completion of the transmission from the distribution device 1 is received).

The video reproduction application 23 is configured to convert the downloaded video data to the HLS format which can be reproduced in the information device 2. Here, in the first embodiment, the video reproduction application 23 is configured to delete the added dummy data (perform the dummy data deletion process) when converting the video data to the HLS format.

Specifically, as shown in FIG. 4, the video reproduction application 23 is configured to convert the video data to the HLS format by creating a plurality of divided files that is divided (TS dividing) at every predetermined time interval (2-second interval, for example) and a playlist file to instruct reproduction of the divided files According to the downloaded video data.

Figure 9:
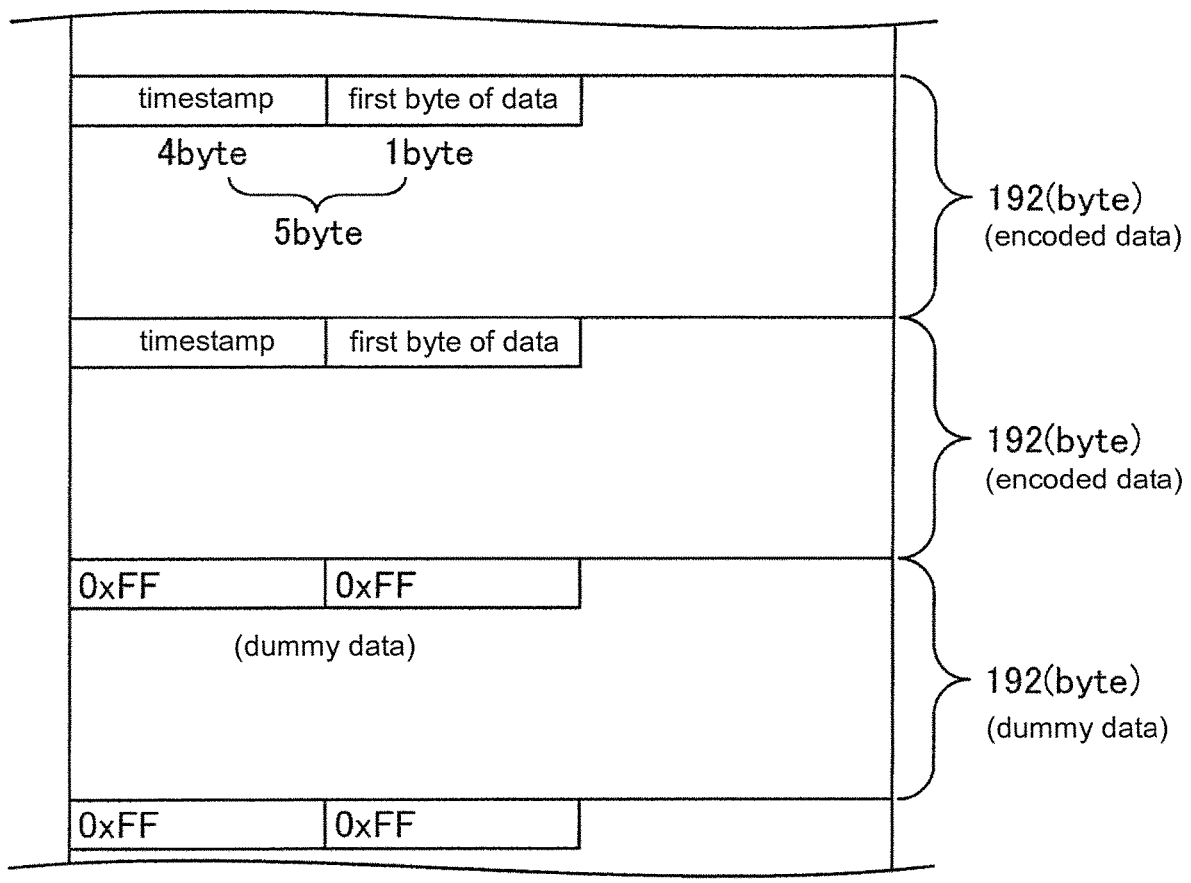
FIG. 9 is a diagram for describing the search process for the dummy data of the information device according to the first embodiment.

Here, as shown in FIG. 9, in the first embodiment, the video reproduction application 23 is configured to determine whether the video data (encoded data with the dummy data added thereto) downloaded from the distribution device 1 is the video data or the dummy data for every predetermined data size (every TS packet (192 bytes), for example).

As shown in FIG. 9, in the TS packet of the video data, a timestamp (first 4 bytes) is added at every 192 bytes. In contrast, the TS packet of the dummy data is assigned entirely with "0xFF". Therefore, it is possible for the video reproduction application 23 to determine whether the data is the video data or the dummy data by analyzing the timestamp (first 4 bytes) (and the next 1 byte, preferably) of the downloaded video data. In addition, the video reproduction application 23 is configured to create the plurality of divided files (refer to FIG. 4) and the playlist file by analyzing the timestamp.

For example, on the basis that (when) the video reproduction application 23 determined that the first 5 bytes of the TS packet (192 bytes) is not the dummy data, the video reproduction application 23 determines whether the first 5 bytes of the next TS packet is the dummy data or not (that is, "0xFF" or not).

On the other hand, on the basis that (when) the video reproduction application 23 determined that the first 5 bytes of the TS packet (192 bytes) is the dummy data, the video reproduction application 23 determines that the chunk including the dummy data (12,288 bytes) is the dummy data. Then, on the basis that (when) the video reproduction application 23 determined that the first 5 bytes of the TS packet (192 bytes) is the dummy data, the video reproduction application 23 deletes the chunk including the TS packet (dummy packet). Then, the video reproduction application 23 determines whether the first 5 bytes of the TS packet of the next chunk (12,288 bytes) is the dummy data or not ("0xFF" or not). The video reproduction application 23 is configured to convert the video data to the HLS format while deleting the added dummy data by repeating the abovementioned process.

Here, the OS 22 transfers the state of the video reproduction application 23 from "Background" to "Suspended" on the basis that (when) the HLS conversion process and the dummy data deletion process do not complete within the predetermined period of time. Accordingly, the HLS conversion process and the dummy data deletion process are halted.

In the first embodiment, under the situation that the video reproduction application 23 is running in the background, the controller 21 (video reproduction application 23) is configured to transmit the request signal again to the distribution device 1 on the basis that (when) the HLS conversion process and the dummy data deletion process after completion of the download of the encoded data (video data) with the dummy data added thereto do not complete within the predetermined period of time.

In this case, the controller 21 repeatedly transmits the request signal until the HLS conversion process and the dummy data deletion process after the completion of the video data download complete.

Video Download Process

Figure 10:
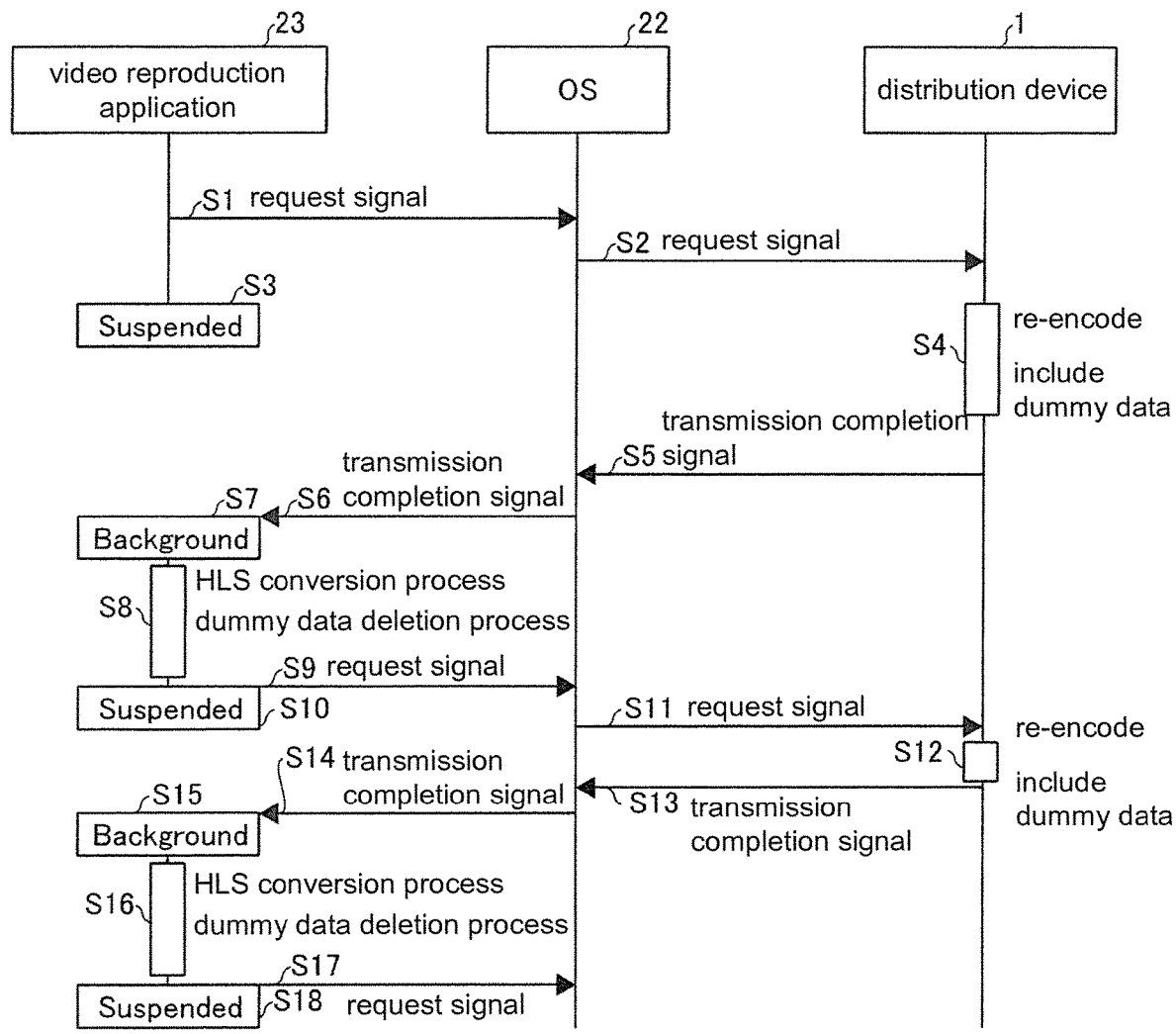
FIG. 10 is a sequence diagram for describing the video data download process of the distribution system according to the first embodiment.

Next, referring to FIG. 10, the video download process according to the first embodiment is described based on the sequence diagram. The operation (processes) of the video download process in the distribution device 1 is executed by the controller 11. The operation (processes) of the OS 22 and the video reproduction application 23 is executed by the controller 21 of the information device 2.

As shown in FIG. 10, in Step S1, the request signal (refer to FIG. 5) for requesting the video data with the dummy data added thereto is transferred (sent) from the video reproduction application 23 to the OS 22.

In Step S2, the request signal is transmitted from the OS 22 to the distribution device 1.

In Step S3, the state of the video reproduction application 23 is changed to "Suspended".

In Step S4, the video data is converted (re-encoded) from the DR format to the AVC format and also the dummy data is added to the encoded data by the distribution device 1.

In Step S5, the signal indicating completion of the transmission of the video data with the dummy data added thereto (transmission completion signal) is transmitted from the distribution device 1 to the OS 22. That is, the completion of the download is notified to the OS 22 from the distribution device 1.

In Step S6, the transmission completion signal is transferred from the OS 22 to the video reproduction application 23.

In Step S7, the state of the video reproduction application 23 is changed from "Suspended" to "Background" by the OS 22.

In Step S8, the HLS conversion process which converts the downloaded video data to the HLS format and the dummy data deletion process which deletes the added dummy data are performed. That is, a plurality of divided files and the playlist file are created based on the downloaded video data while the added dummy data is being deleted (refer to FIG. 4).

In Step S9, the HLS conversion process is halted and the request signal is sent again from the video reproduction application 23 to the OS 22 on the basis that (when) the HLS conversion process does not complete within the predetermined period of time. The download process completes when the HLS conversion process completes within the predetermined period of time.

In Step S10, the state of the video reproduction application 23 is changed from "Background" to "Suspended" as the predetermined period of time has passed.

In Step S11, the request signal is transmitted again from the OS 22 to the distribution device 1.

In Step S12, the video data is converted (re-encoded) from the DR format to the AVC format and also the dummy data is added to the encoded data by the distribution device 1.

Then, in Step S13, the transmission completion signal is transmitted again from the distribution device 1 to the OS 22.

In Step S14, the transmission completion signal is transferred (sent) again from the OS 22 to the video reproduction application 23.

In Step S15, the state of the video reproduction application 23 is changed from "Suspended" to "Background" again by the OS 22.

In Step S16, the HLS conversion process and the dummy data deletion process (processes of Step S8) halted before Step S10 are resumed. That is, it continues the process deleting the dummy data and the process creating the plurality of divided files and the playlist file based on the video data with the dummy data added thereto which is downloaded during Steps S1 to S6. The video data downloaded again during Steps S9 to S13 is not used by the processes and deleted.

Also in Step S16, the HLS conversion process and the dummy data deletion process are halted on the basis that (when) the HLS conversion process and the dummy data deletion process do not complete within the predetermined period of time, and the request signal is again sent from the video reproduction application 23 to the OS 22 in Step S17.

In Step S18, the state of the video reproduction application 23 is changed from "Background" to "Suspended" by the OS 22.

Then, the same processes as Steps S9 to S18 are repeated until the HLS conversion process and the dummy data deletion process complete.

Effects of Distribution Device of First Embodiment

The following effects are obtained from the distribution device 1 of the first embodiment.

In the first embodiment, as mentioned above, the controller 11 is configured to transmit the video data with the dummy data added thereto to the information device 2 according to the request signal from the information device 2. It is preferable that the controller 11 is configured to add the dummy data to the video data and transmit the video data with the dummy data added thereto to the information device 2 when the video data is downloaded by the information device 2 under the situation that the video reproduction application 23 is running in the background. Thereby, it is possible to suppress the reduction of the transfer rate R of the video data transmitted from the distribution device 1 to the information device 2 since the dummy data is added to the video data. As a result, it is possible to suppress the termination of the communication between the information device 2 and the distribution device 1 by the OS 2 because it is suppressed that the transfer rate R becomes lower than the termination threshold value t1. As a result, it is possible to suppress the termination of the video data transmission due to the reduction of the transfer rate R when the download is performed under the situation that the video reproduction application 23 of the information device 2 is running in the background.

In the distribution device 1 of the first embodiment, as mentioned above, the request signal is configured to include the information of the data size of the dummy data (information of "DummyData"). Also, the controller 11 is configured to add the dummy data to the video data, where the dummy data has the data size (chunk size) based on the information of the data size in the request signal. Thereby, the distribution device 1 can add the dummy data having an appropriate data size according to the request from the information device 2. Accordingly, it is possible to suppress the increase in the capacity of the memory part 26 of the information device 2 which is required to store the video data with the dummy data added thereto because it is suppressed that the transmission of the video data to which the dummy data having an excessively large data size compared to the data size required by the information device 2 is added. Also, because it is suppressed that the transmission of the video data to which the dummy data having an excessively small data size compared to the data size required by the information device 2 is added, it is possible to suppress the termination of the communication between the distribution device 1 and the information device 2 by the OS 22 due to the reduction of transfer rate R because of a too small data size.

In the distribution device 1 of the first embodiment, as mentioned above, the controller 11 is configured to add the dummy data to the video data as a packet having a data size that is equal to a natural number multiple of a data size of the packet when the video data is sent. Thereby, it is possible to transmit the packet of the video data and the packet of the dummy data as separate packets (chunks). As a result, the information device 2 can easily determine whether the downloaded data is the video data or the dummy data for every chunk.

Effects of Information Device of First Embodiment

The following effects are obtained from the information device 2 of the first embodiment.

In the information device 2 of the first embodiment, the controller 21 is configured to transmit the request signal for requesting the video data with the dummy data added thereto to the distribution device 1 through the communication part 25 under the situation that the video reproduction application 23 is running in the background, and to receive the video data with the dummy data added thereto from the distribution device 1. Thereby, it is possible to suppress the termination of the video data transmission (download) due to the reduction of the transfer rate R when the download is performed under the situation that the video reproduction device 23 is running in the background. Also, the controller 21 is configured to transmit the request signal for requesting the video data with the dummy data added thereto to the distribution device 1 through the communication part 25 under the situation that the video reproduction application 23 is running in the background. Thereby, it is possible to easily notify that the video data is to be downloaded under the situation that the video reproduction application 23 is running in the background, and to request the video data with the dummy data added thereto.

In the information device 2 of the first embodiment, as mentioned above, the request signal is configured to include the information of the requested transfer rate and the information of the data size of the dummy data requested. The controller 21 is configured to transmit the request signal for requesting the video data to which the dummy data having the data size corresponding to the requested transfer rate is added to the distribution device 1. Thereby, it is possible to request the distribution device 1 to add the dummy data having a large data size when the video data is downloaded under the circumstance that the transfer rate is low and the communication is likely terminated by the OS 22. As a result, it is possible to effectively suppress the reduction of the transfer rate R because it is possible to download the video data to which the dummy data having a more appropriate data size is added.

In the information device 2 of the first embodiment, as mentioned above, the controller 21 is configured to transmit the request signal (including the value of "DummyPacket") to the distribution device 1, where the request signal is for requesting the video data added with the dummy data having a data size with which the transfer rate R becomes greater than or equal to the termination threshold value t1. Thereby, it is possible to download the video data with the dummy data added thereto more reliably under the situation that the transfer rate R becomes more than the termination threshold value t1.

In the information device 2 of the first embodiment, as mentioned above, the controller 21 is configured to determine whether the video data downloaded from the distribution device 1 is the video data or the dummy data for every predetermined data size (every 192 bytes). Thereby, it is possible to reduce the number of times of the process for determining whether the downloaded data is the video data or the dummy data compared to determining whether the downloaded data is the video data or the dummy data by inspecting the entire data.

In the information device 2 of the first embodiment, as mentioned above, the controller 21 is configured to convert the format of downloaded video data with the dummy data added thereto to a reproducible format and also to delete the added dummy data when converting the video data to the reproducible format (HLS format). Thereby, the video data can be reproduced in the situation that the dummy data deleted.

In the information device 2 of the first embodiment, as mentioned above, the controller 21 is configured to transmit the request signal (again) to the distribution device 1 when the process for converting the video data to a reproducible format does not complete within the predetermined period of time after completion of the download of the video data with the dummy data added thereto. Thereby, even the HLS conversion process and the dummy data deletion process do not complete within the predetermined period of time, the predetermined period of time can be substantially extended because the HLS conversion process and the dummy data deletion process can be performed during the predetermined period of time after the completion of downloading the re-transmitted video data.

Second Embodiment

Next, referring to FIGS. 1, 3 and 11 to 15, the second embodiment is described. An information device 202 of the second embodiment is configured to create a seek reproduction data (seek reproduction table) for reproducing the video data by specifying a reproduction position, which is different from the information device 2 of the first embodiment. The seek reproduction data is an example of "reproduction data" in the claims.

Configuration of Distribution System

As shown in FIG. 1, a distribution system 200 according to the second embodiment of the present invention includes the distribution device 1 and the information device 202. As shown in FIG. 3, the information device 202 includes a controller 221, an OS 222, a video reproduction application 223 and a memory part 226. The same reference numerals are used for the same components as the first embodiment and the descriptions thereof are omitted. The information device 202 is an example of "external device" in the claims. The video reproduction application 223 is an example of "application" in the claims.

Configuration of Controller Regarding Video Download

The OS 222 is configured to delay the time at which the video reproduction application 223 starts the process after the completion of downloading the video data, which is different from the first embodiment. The more the number of download increases, the more the OS 222 increases the delay period to the time at which the video reproduction application 223 starts the process.

For example, if the same video data is downloaded three times from the distribution device 1, the OS 222 sets the delay period for transmitting the first transmission completion signal to the video reproduction application 223 to 0 second, the delay period for transmitting the second transmission completion signal to 30 seconds, and the delay period for transmitting the third transmission completion signal to 90 seconds. That is, when multiple downloads are performed by an application such as the video reproduction application 223 of the first embodiment, the period of time to complete the process to convert the video data to a reproducible format is increased because of the delay period of the OS 222.

Figures 11, 12:
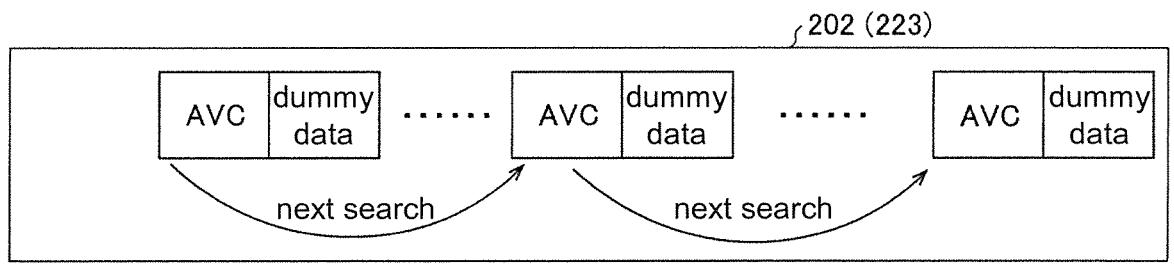
FIG. 11 is a diagram illustrating the seek reproduction table of the information device according to the second embodiment.
FIG. 12 is a diagram for describing the search data size when creating the seek reproduction table of the information device according to the second embodiment.

In the second embodiment, as shown in FIG. 11, the controller 221 is configured to store the video data with the dummy data added thereto in the memory part 226 (local server) and create the reproduction data (seek reproduction table) which correlates the reproduction time of the video data and the capacity value of the video data. The controller 221 is configured to convert the video data to a reproducible format with the specified reproduction position as the starting point based on the seek reproduction table when the seek reproduction is performed.

Specifically, in the second embodiment, as shown in FIG. 11, the video reproduction application 223 is configured to perform the process to create seek reproduction table (referred to as the "seek reproduction table creation process" hereinafter) after the completion of downloading the video data, which is different from the first embodiment in which the HLS conversion process and the dummy data deletion process are performed after (right after) the completion of downloading the video data (after obtaining the transmission completion signal).

The seek reproduction table is a data for the seek reproduction that specifies the reproduction position in the video data to reproduce the video data, and is a data that correlates the reproduction time (in seconds) of the video data and the capacity value (in bytes) of the video data. In FIG. 11, the seek reproduction table has a data correlating the reproduction time (in seconds) of the video data and the capacity value (in bytes) of the video data at a time interval of 1 second.

Also, as shown in FIG. 12, the video reproduction application 223 is configured to create the seek reproduction table correlating the reproduction time (in seconds) of the video data and the capacity value (in bytes) of the video data by searching and analyzing the timestamp of the video data (refer to FIG. 9) based on the bit rate (byte/s) information of the video data (requested transfer rate).

Here, as shown in FIG. 13, the video reproduction application 223 is configured to set a search data size for searching the video data with the dummy data added thereto larger than a search data size for the video data without the dummy data under the same requested transfer rate.

Specifically, as shown in FIG. 13, the video reproduction application 223 determines (sets) the search data size for searching the video data without the dummy data to a value with which every data corresponding to approximately ⅓ second can be searched, for example.

Specifically, the controller 221 (video reproduction application 223) determines the search data size to 192×500 (bytes) when the requested transfer rate is "2.4 Mbps". The video reproduction application 223 determines the search data size to 192×360 (bytes) when the requested transfer rate is "1.5 Mbps". The video reproduction application 223 determines the search data size to 192×250 (bytes) when the requested transfer rate is "1.0 Mbps". The video reproduction application 223 determines the search data size to 192×130 (bytes) when the requested transfer rate is "0.6 Mbps".

Also, as shown in FIG. 13, the video reproduction application 223, for example, takes the data size of the dummy data into account and determines (sets) the search data size for searching the video data with the dummy data added thereto to a value with which every data corresponding to approximately ⅓ second can be searched. For example, the video reproduction application 223 determines (sets) the search data size to a value with which every data corresponding to approximately ⅔ second can be searched when the value of "DummyPacket" is 1.

Specifically, the controller 221 (video reproduction application 223) determines the search data size to 192×896 (bytes) when the requested transfer rate is "2.4 Mbps". The video reproduction application 223 determines the search data size to 192×640 (bytes) when the requested transfer rate is "1.5 Mbps". The video reproduction application 223 determines the search data size to 192×512 (bytes) when the requested transfer rate is "1.0 Mbps". and the video reproduction application 223) determines the search data size to 192×256 (bytes) when the requested transfer rate is "0.6 Mbps".

Configuration of Controller of Information Device Regarding Video Data Reproduction Here, in the second embodiment, the controller 221 (video reproduction application 223) is configured to perform the HLS conversion process and the dummy data deletion process when reproducing the video data. That is, when reproducing the video data, the video reproduction application 223 is configured to convert the video data to the HLS format to reproduce the video data while deleting the dummy data from the video data added with the dummy data stored in the memory part 226.

The controller 221 is configured to specify the reproduction position based on the seek reproduction table on the basis that (when) the reproduction position is specified by the user by using the operation part 27. The controller 221 is configured to perform the HLS conversion process and the dummy data deletion process from the specified reproducing position and then reproduce the video data.

Specifically, as shown in FIG. 14, the controller 221 (video reproduction application 223) is configured to send a local request signal for specifying the reproduction position to the memory part 226. Then, as shown in FIG. 15, the controller 221 (video reproduction application 223) is configured to perform the HLS conversion process and the dummy data deletion process to the data starting from the specified reproduction position retrieved from the memory part 226 by executing conversion codes for the HLS conversion and reproduction, and reproduce the data starting from the specified reproduction position.

For example, when a reproduction time of 10 seconds is specified by the user by using the operation part 27 as shown in FIG. 11, the video reproduction application 223 transfers the local request signal to the memory part 226 as shown in FIG. 14, where the local request signal has information of 3,456,000 bytes ("3456000-") in "Range" as the capacity value corresponding to the reproduction position (reproduction time of 10 seconds) according to the seek reproduction table (refer to FIG. 11).

Then, as shown in FIG. 15, the video reproduction application 223 performs the HLS conversion process and the dummy data deletion process (refer to FIG. 4) to the video data starting from the reproduction time of 10 seconds retrieved from the memory part 226 by executing the conversion codes, and reproduces the video data.

Other configuration of the second embodiment is the same as the first embodiment.

Video Download Process

Figure 16:
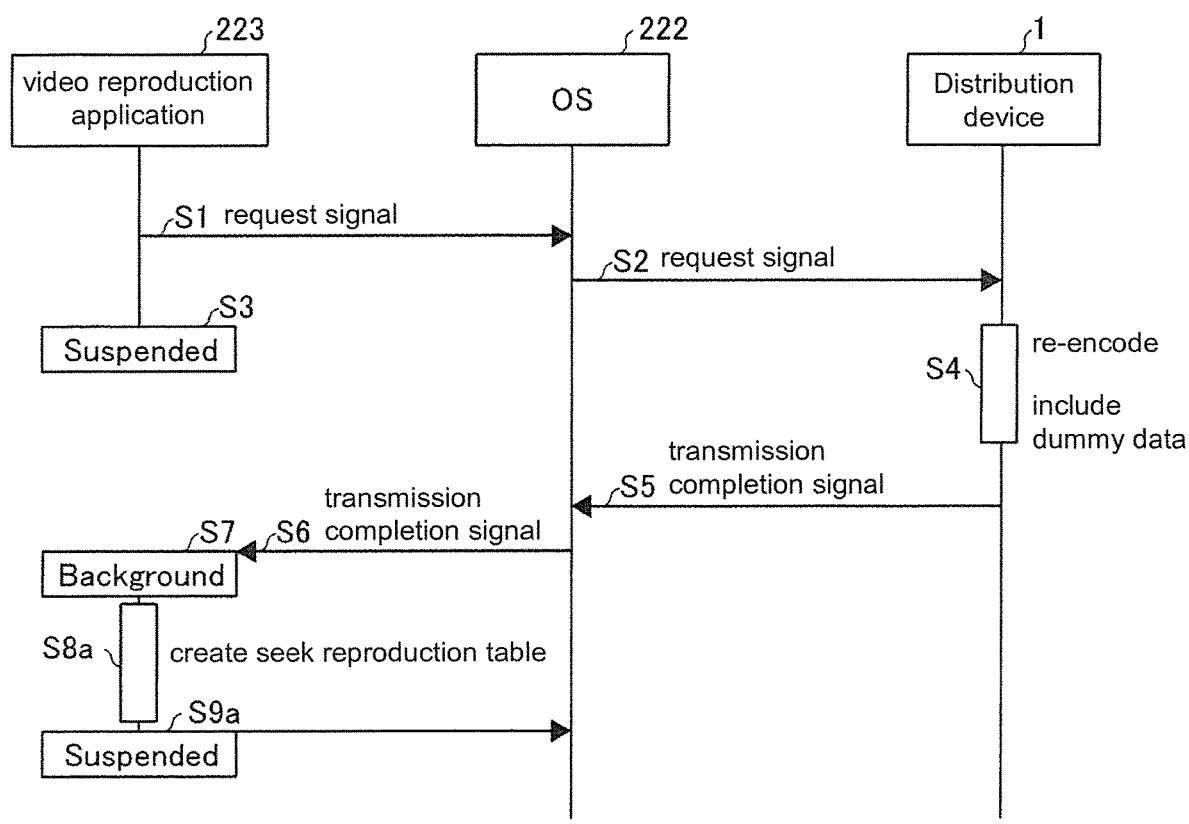
FIG. 16 is a sequence diagram for describing the video data download processing of the distribution system according to the second embodiment.

Next, referring to FIG. 16, the video download process according to the second embodiment is described based on the sequence diagram. In the video download process, the operations of the OS 22 and the video reproduction application 223 are executed by the controller 221. The same reference numerals are assigned to the processes the same as the first embodiment and the descriptions thereof are omitted.

As shown in FIG. 16, the same processes as the first embodiment are performed from Steps S1 to S7.

Then, in Step S8a, the seek reproduction table creation process is performed. That is, the seek reproduction table correlating the reproduction time (in seconds) of the video data and the capacity value (in bytes) of the video data is created by analyzing the timestamp of the video data based on the bit rate information of the video data and the data size of the dummy data.

Then, in Step S9a, after the predetermined period of time has passed, the state of the video reproduction application 223 is changed from "Background" to "Suspended".

Then, the download process according to the second embodiment completes.

Effects of Information Device of Second Embodiment

The following effects are obtained from the information device 202 of the second embodiment.

As mentioned above, the information device 202 of the second embodiment further includes the memory part 226 (local server). The controller 221 stores the video data with the dummy data added thereto in the memory part 226, creates the seek reproduction data (refer to FIG. 11) (correlating the reproduction time (in bytes) and the capacity value (in bytes) of the video data) for seek reproduction which reproduces the video data from a specified reproduction position, and converts the video data to a reproducible format with the specified reproduction position as the starting point based on the seek reproduction data (reproduction data) when performing seek reproduction. Thereby, it is possible to suppress the increase in the number of download because the time required by the process for creating the seek reproduction data (reproduction data) is shorter than the time required to convert the video data to a reproducible format. Also, it is possible to reproduce the video data from an arbitrary position based on the seek reproduction data.

Other effects of the second embodiment are the same as the first embodiment.

Third Embodiment

Figure 17:
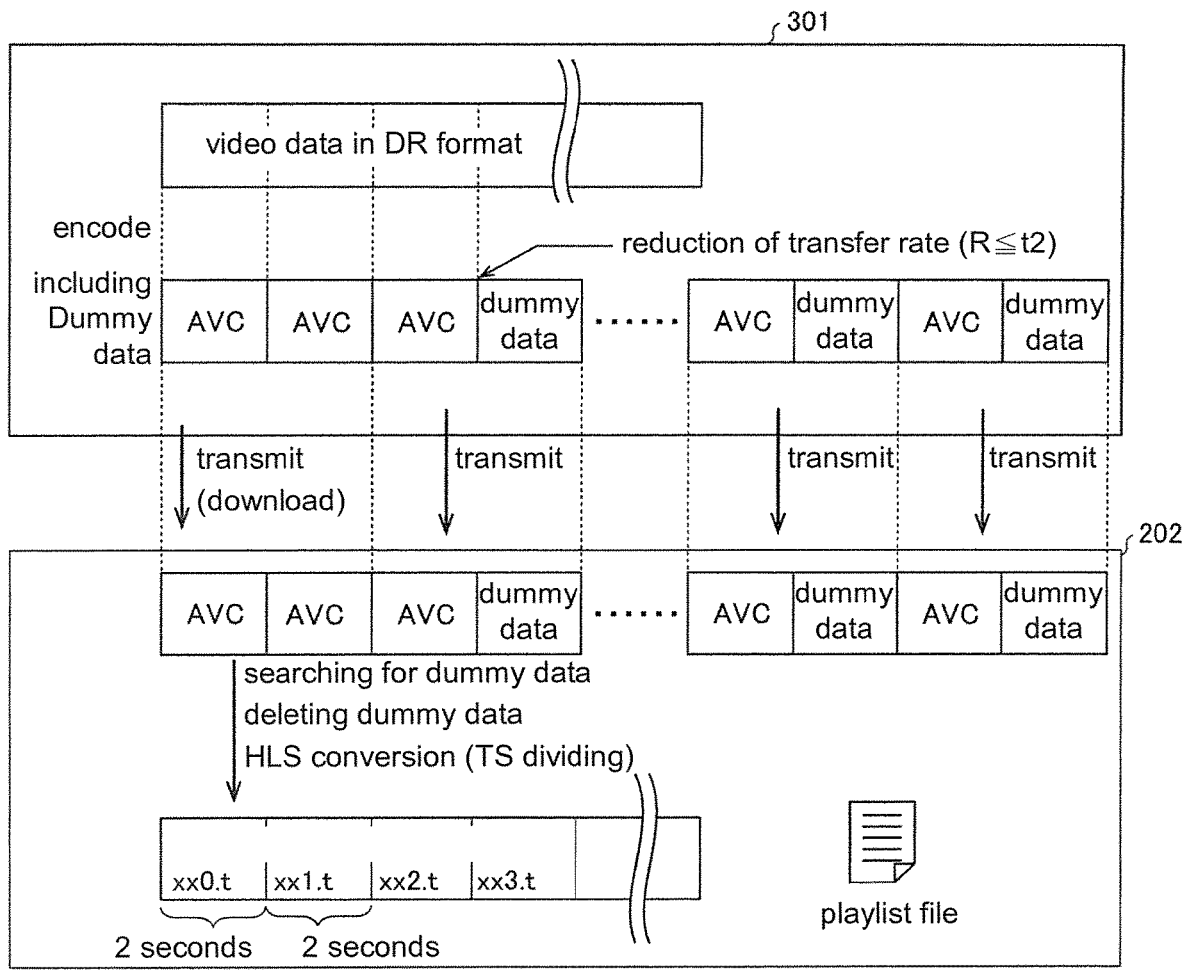
FIG. 17 is a diagram for describing the process of the distribution system according to the second embodiment to add a dummy data to the video data.

Next, referring to FIGS. 1, 2 and 17, the third embodiment is described. In the third embodiment, a controller 311 of a distribution device 301 is configured to add the dummy data to the video data on the basis that (when) the transfer rate R of the video data transmitted to the information device 202 becomes less than or equal to an inclusion commencement threshold value t2.

Configuration of Distribution System

As shown in FIG. 1, a distribution system 300 according to the third embodiment of the present invention includes the distribution device 301 and the information device 202. Also, the distribution device 301 includes a controller 311 that executes a program of software 312. The same reference numerals are assigned to the same components as the first and second embodiments and the descriptions thereof are omitted.

Configuration of Controller of Distribution Device

Here, in the third embodiment, as shown in FIG. 17, the controller 311 is configured to add the dummy data to the video data (encoded data) on the basis that (when) the transfer rate R of the video data transmitted to the information device 202 becomes less than or equal to the inclusion commencement threshold value t2. The inclusion commencement threshold value t2 is an example of "first threshold value" in the claims.

Specifically, the inclusion commencement threshold value t2 is set to a greater value than the termination threshold value t1. The controller 311 is configured to obtain the value of the transfer rate R when transmitting the video data to the information device 202. In detail, the controller 311 is configured to obtain (calculates) the transfer rate R from the data distribution time of each chunk size. The controller 311 is configured to compare the transfer rate R and the inclusion commencement threshold value t2.

The controller 311 is configured to add the next chunk following the chunk corresponding to the obtained transfer rate R on the basis that (when) the transfer rate R becomes less than or equal to the inclusion commencement threshold value t2. The controller 311 is configured to transmit only the video data (encoded data in the AVC format) without adding the dummy data on the basis that (when) the transfer rate R becomes greater than the inclusion commencement threshold value t2.

Other configuration of the third embodiment is the same as the first embodiment.

Video Download Processing

Figure 18:
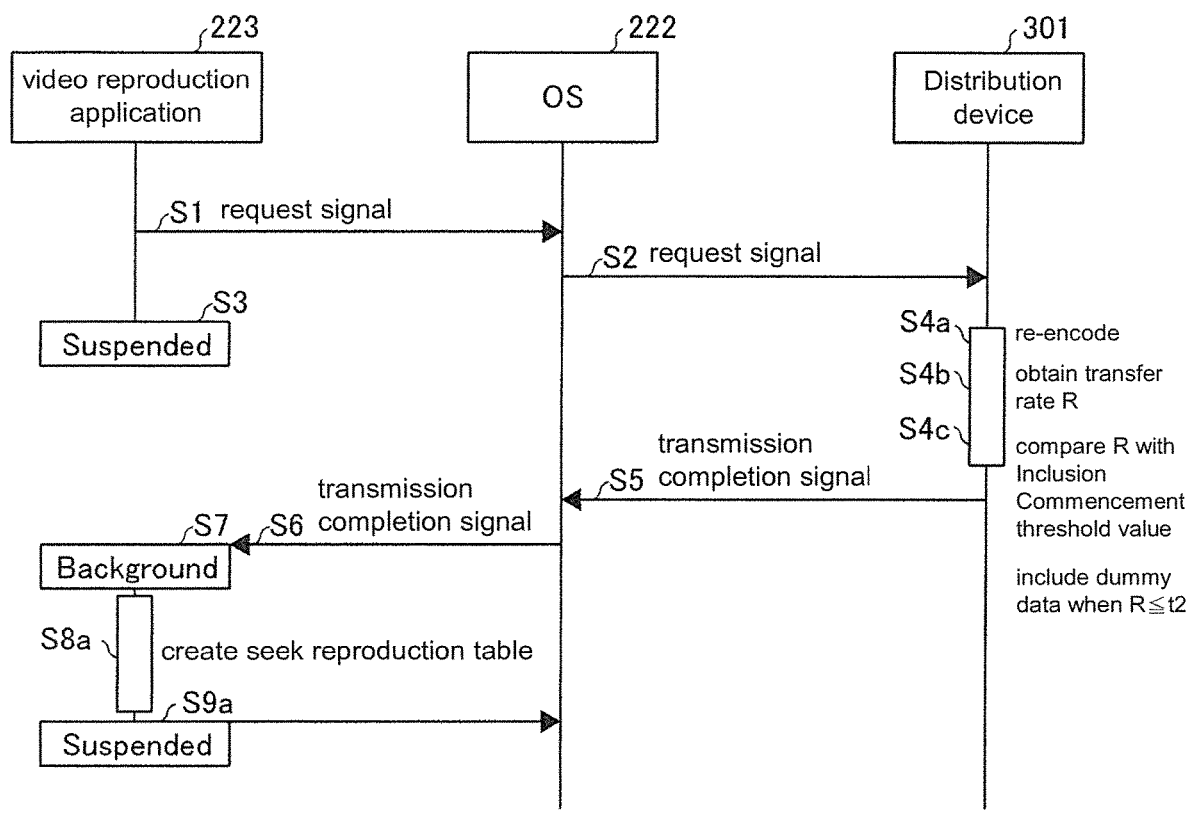
FIG. 18 is a sequence diagram for describing the video data download processing of the distribution system according to the third embodiment.

Next, referring to FIG. 18, the video download process according to the third embodiment is described based on the sequence diagram. In the video download process, the operations of the OS 222 and the video reproduction application 223 are executed by the controller 221. Also, the operations of the distribution device 301 are executed by the controller 311. The same reference numerals are assigned to the processes the same as the first and the second embodiments and the descriptions thereof are omitted.

As shown in FIG. 18, the same processes as the first embodiment are performed from Steps S1 to S3.

Then, in Step S4a, in the distribution device 301, the video data in the DR format is re-encoded to the AVC format, and the re-encoded video data (encoded data) is transmitted to the information device 202. The transfer rate R is obtained by the distribution device 301 at the time.

Then, in Step S4b, the transfer rate R and the inclusion commencement threshold value t2 are compared by the distribution device 301. If the transfer rate R is greater than the inclusion commencement threshold value t2 and also the video data transmission is not completed yet, the processing returns to Step S4a. If the transfer rate R is greater than the inclusion commencement threshold value t2 and also the video data transmission is completed, the processing proceeds to Step S5. If the transfer rate R is less than or equal to the inclusion commencement threshold value t2, the processing proceeds to Step S4c.

Then, in Step S4c, the dummy data is added to the video data (encoded data). After that, if the video data transmission is completed, the process proceeds to Step S5. If the video data transmission is not completed yet, the process returns to Step S4a.

Then, in Steps S5 to S9a, the same processes as the second embodiment are performed, and the video download processing according to the third embodiment is finished.

Effects of Distribution Device of Third Embodiment

The following effects are obtained from the distribution device 301 of the third embodiment.

As mentioned above, the distribution device 301 of the third embodiment adds the dummy data to the video data when the transfer rate R of the video data transmitted to the information device 202 becomes less than or equal to the inclusion commencement threshold value t2. Thereby, it is possible to suppress the addition of the dummy data to the video data when the transfer rate R is greater than the inclusion commencement threshold value t2. Also, when the transfer rate R is less than or equal to the inclusion commencement threshold value t2, it is possible to effectively suppress the termination of the video data transmission due to the reduction of the transfer rate R because the dummy data is effectively added to the video data.

Other effects of the third embodiment are the same as the first embodiment.

Fourth Embodiment

Figure 19:
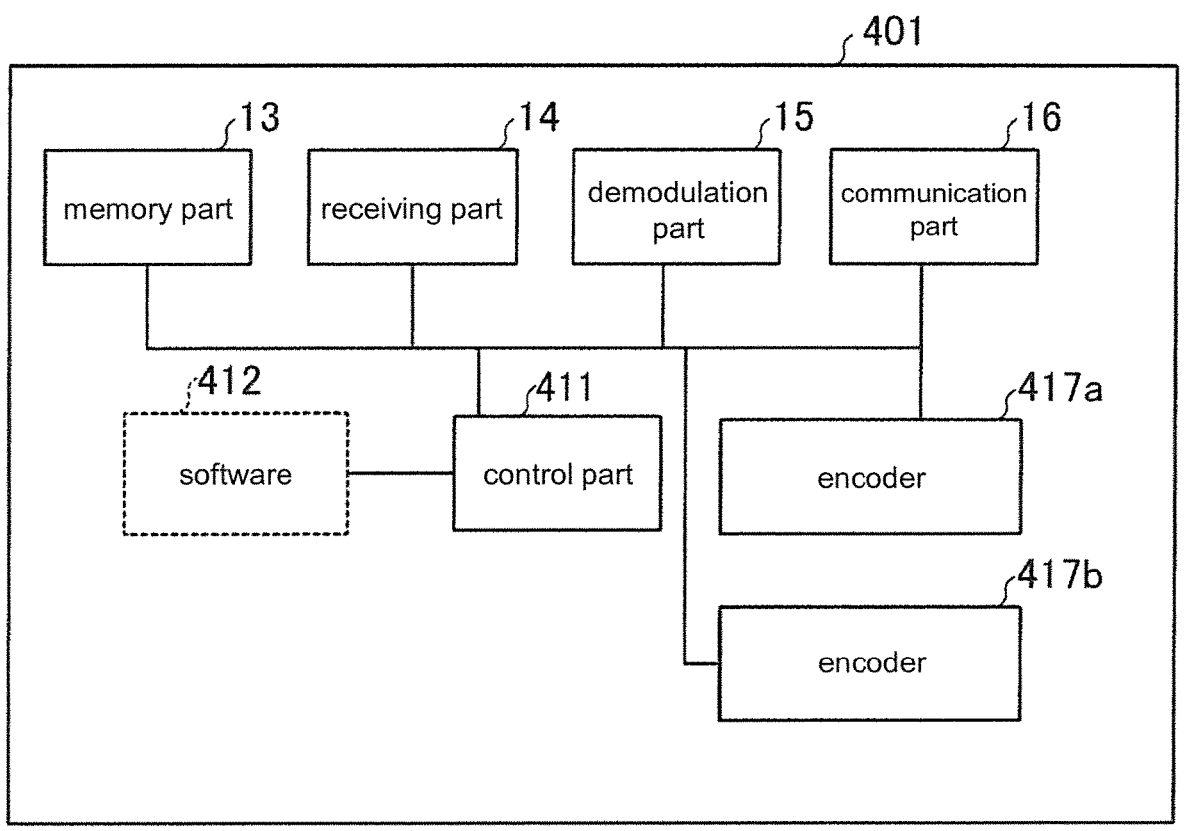
FIG. 19 is a block diagram illustrating overall configuration of the distribution device according to the fourth embodiment.

Next, referring to FIGS. 1, 3 and 19, the fourth embodiment is described. In the fourth embodiment, a distribution device 401 is configured to transmit a plurality of video data to an information device 402 by combining the plurality of video data based on a combined data request signal. The distribution device 401 is configured to add the dummy data to the video data which is not transmitted yet and transmit the video data with the dummy data added thereto to an information device 402 on the basis that (when) transmission of a portion of the plurality of video data is completed.

Configuration of Distribution System

As shown in FIG. 1, a distribution system 400 includes the distribution device 401 and the information device 402.

Also, as shown in FIG. 19, the distribution device 401 includes a controller 411 that executes a software 412 and encoders 417a and 417b. As shown in FIG. 3, the information device 402 includes a controller 421 and a video reproduction application 423. The same reference numerals are assigned to the same components as the first to third embodiments and the descriptions thereof are omitted. The distribution device 401 is an example of "external device" in the information device claims. The information device 402 is an example of "external device" in the distribution device claims. The video reproduction application 423 is an example of "application" in the claims.

Configuration of Controller of Information Device

In the fourth embodiment, as shown in FIG. 20, the video reproduction application 423 of the information device 402 is configured to transmit the request signal to the distribution device 401, and the request signal includes a combined data request information (combined data request signal) ("CombinationStream") to request transmission of a plurality of video data under the situation that the plurality of video data is combined (aggregated).

For example, as shown in FIG. 20, the video reproduction application 423 is configured to add an information to specify the video data to be combined ("CombinationID") (information of URL) when requesting two video data under the situation that the two video data are combined. The information device 402 is configured to transmit the request signal to the distribution device 401.

Figure 21:
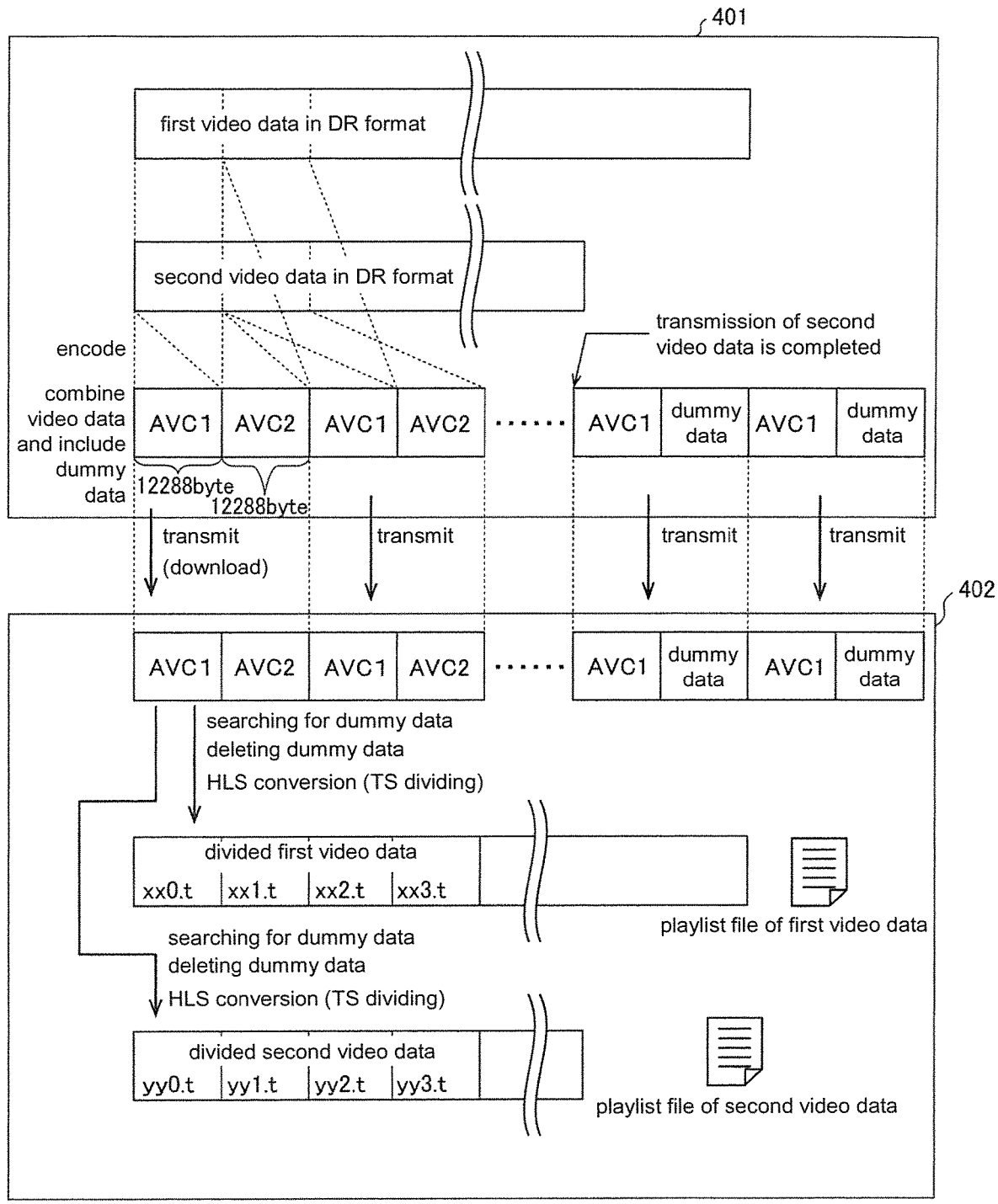
FIG. 21 is a diagram for describing the processes of the distribution system according to the fourth embodiment to combine a plurality of video data and to add the dummy data to the video data.

As shown in FIG. 21, the video reproduction application 423 of the information device 402 is configured to obtain the combined plurality of video data from the distribution device 401 and perform the HLS conversion process to each of the video data. When performing the HLS conversion process, the video reproduction application 423 searches the dummy data added to the video data and performs the dummy data deletion process for deleting the dummy data, as the same as the video reproduction application 23 of the first embodiment.

Configuration of Distribution Device

In the fourth embodiment, as shown in FIG. 21, the controller 411 of the distribution device 401 is configured to transmit a plurality of video data to the information device 402 under the situation that the plurality of video data is combined (perform a video data combining process) based on the combined data request information. The controller 411 is configured to add the dummy data to the video data which is not transmitted yet on the basis that (when) the transmission of a portion of the plurality of video data is completed, and transmit the video data with the dummy data added thereto to the information device 402.

Specifically, the controller 411 combines a plurality of video data mutually for each chunk size while re-encoding the plurality of video data by the encoders 417a and 417b according to the request signal. Then, when the transmission of a portion of the plurality of the video data is completed, the controller 411 inserts the dummy data (dummy packet) at the position (time) corresponding to the video data the transmission of which is completed, and transmits the video data with the dummy data added thereto to the information device 402.

For example, FIG. 21 shows an example that the request signal includes the combined data request information which requests two video data (the first video data and the second video data). It is assumed that the entire data size of the first video data is larger than the second video data. The encoders 417a and 417b are configured to be able to simultaneously convert (re-encode) a plurality of (two, for example) video data in the DR format to the video data in the AVC format. The controller 411 of the distribution device 401 is configured to combine the first video data and the second video data mutually for each chunk size while re-encoding the first video data and the second video data by the encoders 417a and 417b based on the request signal.

The controller 411 is configured to insert (add) the dummy data at the position (time) corresponding to the second video data and transmit the video data with the dummy data added thereto to the information device 402 on the basis that (when) the transmission of the second video data is completed.

Other configuration of the fourth embodiment is the same as the first embodiment.

Video Download Process

Figure 22:
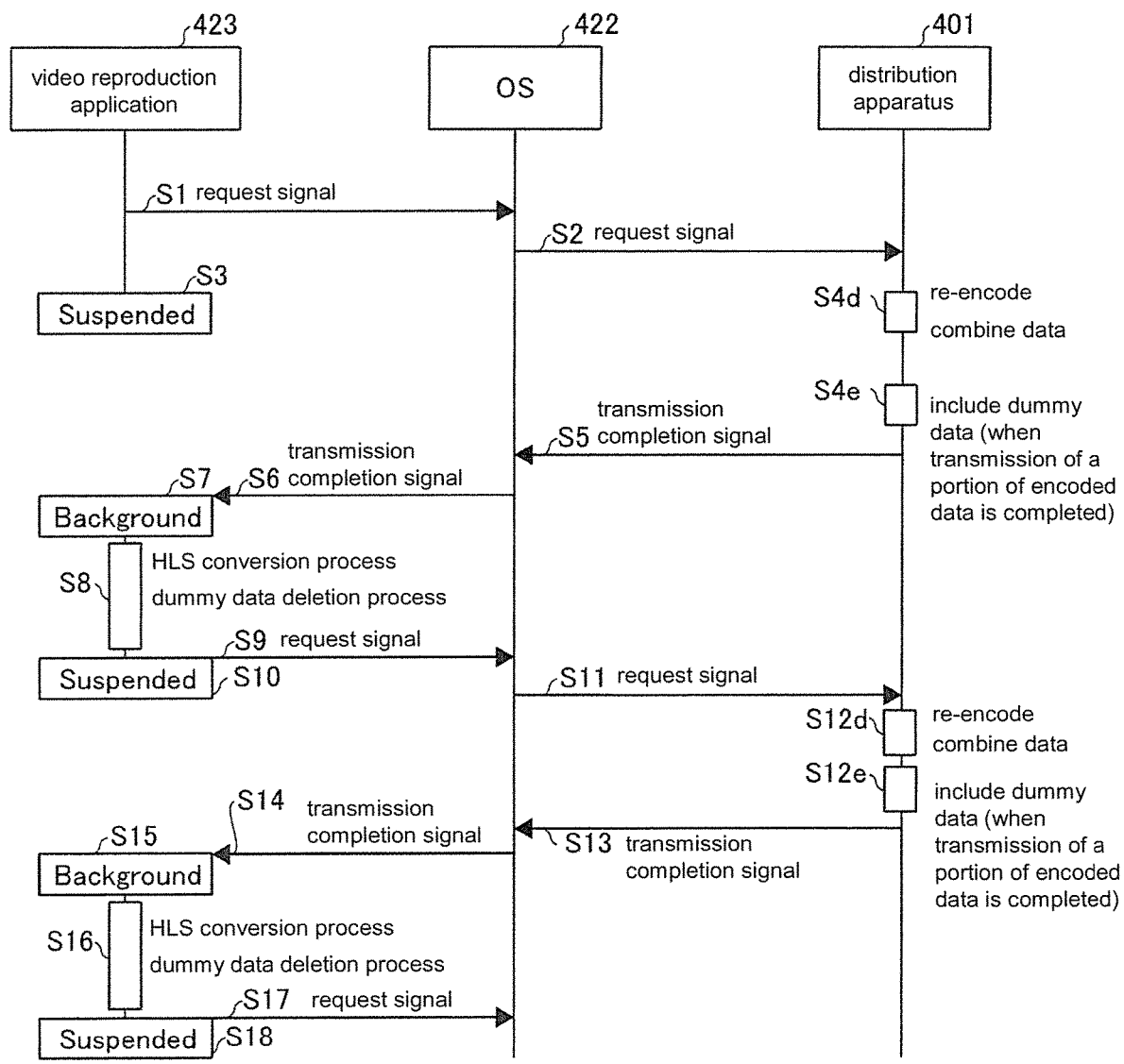
FIG. 22 is a sequence diagram for describing the video data download process of the distribution system according to the fourth embodiment.

Next, referring to FIG. 22, the video download process according to the fourth embodiment is described based on the sequence diagram. In the video download process, the operations of the distribution device 401 are executed by the controller 411. The operations of an OS 422 and the video reproduction application 423 are executed by the controller 421.

As shown in FIG. 22, in Steps S1 to S3, the same processes as the first embodiment are performed. In the fourth embodiment, the request signal includes the combined data request information.

Then, in Step S4d, the video data combining process is performed by the distribution device 401. Then, the process proceeds to Step S4e when the transmission of a portion of the plurality of video data is completed.

Then, in Step S4e, the dummy data is added to the video data the transmission of which is not completed yet by the distribution device 401. After that, the process proceeds to Step S5.

Then, in Steps S5 to S11, the same processes as the first embodiment are performed.

Then, in Step S12d, the video data combining process is performed by the distribution device 401. Then, the process proceeds to Step S12e when the transmission of a portion of the plurality of video data is completed.

Then, in Step S12e, the dummy data is added to the video data the transmission of which is not completed yet by the distribution device 401. Then, the process proceeds to Step S13.

Then, in Steps S13 to S19, the same processes as the first embodiment are performed.

Effects of Distribution Device of the Fourth Embodiment

The following effects are obtained from the distribution device 401 of the fourth embodiment.

In the fourth embodiment, as mentioned above, the request signal includes the information for requesting the transmission of the plurality of video data (combined data request information) under the situation that the plurality of video data is combined. Also, the controller 411 of the distribution device 401 transmits the plurality of video data to the information device 401 by combining the plurality of video data according to the request signal (combined data request signal). On the basis that (When) the transmission of a portion of the plurality of video data is completed, the controller 411 adds the dummy data to the video data the transmission of which is not completed yet, and transmits the video data with the dummy data added thereto to the information device 402. Thereby, even when the transmission of a portion of the plurality of video data is completed, it is possible to suppress the reduction of the transfer rate R due to the completion of the transmission of a portion of the video data because the dummy data is added to the video data that is not completely transmitted.

Other effects of the fourth embodiment are the same as the first embodiment.

Modified Examples

The disclosed embodiments should be considered as examples and not limitations by all means. The scope of the present invention is defined by the claims rather than the descriptions of the abovementioned embodiments, and includes the meanings equivalent to the claims and all the modification (modified examples) within the scope.

For example, various states of the present invention are shown in the first to the fourth embodiments, but the present invention is not limited thereto. The present invention includes states that appropriately combine one or more configurations of each embodiment and the configurations of another embodiment.

Also, the first to the fourth embodiments show examples that use a video reproduction device as the distribution device and a portable information device as the information device, but the present invention is not limited thereto. In the present invention, devices other than the video reproduction devices (server devices, etc., for example) that are capable of distributing video data may be used as the distribution device. Also. Information devices other than the portable information devices that are capable of downloading video data may be used.

Also, in the first to the fourth embodiments, "0xFF" is used as an example of the dummy data, but the present invention is not limited thereto. A value other than "0xFF" that can be specified as the dummy data may be used in the disclosure. For example, the ID of the distribution device, information device and the video data, etc. may be (copied and) added as the dummy data.

Also, the first to the fourth embodiments show examples that configure the dummy data as a packet having a data size that is equal to the chunk size of the video data multiplied by a natural number, but the present invention is not limited thereto. In the present invention, the dummy data may be configured to have a data size that is equal to the chunk size of the video data multiplied by a fraction, or to have a predetermined data size regardless of the chunk size.

Also, the first to the fourth embodiments show examples that the dummy data having a data size corresponding to the requested transfer rate is added to the video data, but the present invention is not limited thereto. In the present invention, the dummy data having a predetermined data size regardless of the requested transfer rate may be added to the video data.

Also, the first to the fourth embodiments show examples that the downloaded video data is converted to the HLS format which is reproducible by the information device, but the present invention is not limited thereto. In the present invention, the video data may be converted to a format that is reproducible by the information device, other than the HLS format.

Also, the second and third embodiments show an example that the seek reproduction table is created as a data for seek reproduction that reproduces the video data with a specified reproduction position, but the present invention is not limited thereto. In the present invention, a data other than the seek reproduction table may be created for seek reproduction that reproduces the video data with a specified reproduction position.

What is claimed is:

1. A distribution device, comprising:
a communication part, communicating with an external device;
an encoder;
a memory part, storing a video data; and
a controller, configured to:
receive, from the communication part a request signal from the external device, wherein the request signal comprises a data size of predetermined data and an information of a requested transfer rate, wherein the requested transfer rate is selected by a user from a requested transfer rate menu;
receive, from the communication part the request signal from the external device, wherein the request signal for requesting the video data including the predetermined data having a data size with which a transfer rate of video data becomes greater than or equal to a second threshold value;
add the predetermined data having the data size to the video data, wherein the predetermined data is different from the video data;
transmit the video data to the external device based on the request signal from the external device through the communication part;
transmit the video data including the predetermined data to the external device through the communication part on a basis that a transfer rate of transmitting the video data to the external device becomes less than or equal to a first threshold value; and
transmit the video data without including the predetermined data to the external device through the communication part on a basis that a transfer rate of transmitting the video data to the external device becomes greater than the first threshold value,
wherein the second threshold value is greater than or equal to the first threshold value,
wherein the controller's configured to transmit the video data including the predetermined data having a large data size to the external device through the communication part when the requested transfer rate is low among the requested transfer rate menu, to transmit the video data including the predetermined data having a small data size to the external device when the requested transfer rate is high among the requested transfer rate menu, and to transmit a packet of the video data and a packet of the predetermined data as separate packets to the external device,
wherein the predetermined data is a packet having a data size that is equal to the natural number multiple of the data size of a packet, the data size of the packet comprises a data size of an encoded data received by the encoder,
wherein the natural number's greater than or equal to one,
wherein the controller transmits the video data including the predetermined data to the external device through the communication part on a basis that a transmission of a portion of the plurality of the video data is completed.

2. The distribution device according to claim 1, wherein the controller transmits the video data without including the predetermined data to the external device through the communication part when a value of the data size is zero.

3. The distribution device according to claim 1, wherein the request signal received from the communication part comprises an information that requests to transmit a plurality of video data, and the controller transmits the plurality of the video data to the external device through the communication part based on the request signal under a situation that the plurality of the video data is combined.

4. An information device, comprising:
a communication part, communicating with an external device;
an encoder; and
a controller, executing an application that reproduces a video data downloaded from the external device through the communication part,
wherein the controller transmits a request signal to the external device through the communication part under a situation that the application is running in a background, and receives the video data including predetermined data from the external device, wherein the video data including the predetermined data is transmitted from the external device through the communication part on a basis that a transfer rate of transmitting the video data becomes less than or equal to a first threshold value,
the controller transmits the request signal for requesting the video data including the predetermined data having a data size with which a transfer rate of the video data becomes greater than or equal to a second threshold value to the external device through the communication part,
where the request signal received from the communication part comprises a data size of the predetermined data and an information of a requested transfer rate, and the requested transfer rate is selected by a user from a requested transfer rate menu,
wherein the request signal is for requesting the video data including the predetermined data having a data size corresponding to the requested transfer rate,
wherein the controller is configured to transmit the request signal for requesting the video data including the predetermined data having a large data size to the external device through the communication part when the requested transfer rate is low among the requested transfer rate menu, to transmit the request signal for requesting the video data including the predetermined data having a small data size to the external device through the communication part when the requested transfer rate is high among the requested transfer rate menu, to transmit a packet of the video data and a packet of the predetermined data as separate packets to the external device through the communication part, and to transmit the video data without including the predetermined data to the external device through the communication part on a basis that a transfer rate of transmitting the video data to the external device becomes greater than the first threshold value,
wherein the second threshold value is greater than or equal to the first threshold value,
wherein the predetermined data is a packet having a data size that is equal to the natural number multiple of the data size of a packet, the data size of the packet comprises a data size of an encoded data received by the encoder,
wherein the natural number's greater than or equal to one,
wherein the controller transmits the video data including the predetermined data to the external device through the communication part on a basis that a transmission of a portion of the plurality of the video data is completed.

5. The information device according to claim 4, wherein the controller transmits the request signal through the communication part in which a value of the data size is set to zero to the external device when requesting the video data without the predetermined data.

6. The information device according to claim 4, wherein the controller transmits the request signal through the communication part in which a value of the data size is set to a natural number greater than or equal to one to the external device when requesting the data size including the predetermined data.

7. The information device according to claim 4, wherein the controller determines whether the video data or the predetermined data is downloaded for each predetermined data size in the video data downloaded from the external device through the communication part.

8. The information device according to claim 4, wherein the controller determines whether the video data or the predetermined data is downloaded based on a portion of data of each predetermined data size in the video data downloaded from the external device through the communication part.

9. The information device according to claim 4, wherein the controller converts a format of the video data including the predetermined data downloaded from the external device through the communication part to a reproducible format, and deletes the predetermined data.

10. The information device according to claim 9, wherein the controller transmits the request signal to the external device through the communication part on a basis that a process to convert the video data to the reproducible format by the encoder does not complete within a predetermined period of time after a download of the video data including the predetermined data is completed.

11. The information device according to claim 9, further comprising:
a memory part, storing the video data,
wherein the controller stores the video data including the predetermined data in the memory part, and creates a reproduction data that correlates a reproduction time of the video data and a capacity value of the video data, and
the controller converts the video data to the reproducible format by the encoder with a specified reproduction position as a starting point based on the reproduction data when specifying a reproduction position in the video data to reproduce the video data.

* * * * *